(12) United States Patent
Nadella et al.

(10) Patent No.: US 8,877,331 B2
(45) Date of Patent: **\*Nov. 4, 2014**

(54) MULTI-LAYERED FOAMED POLYMERIC OBJECTS HAVING SEGMENTED AND VARYING PHYSICAL PROPERTIES AND RELATED METHODS

(75) Inventors: Krishna Nadella, Redmond, WA (US); Xiaoxi Wang, Arlington, WA (US)

(73) Assignees: MicroGREEN Polymers, Arlington, WA (US); University of Washington, Seattle, WA (US)

( * ) Notice: Subject to any disclaimer, the term of this patent is extended or adjusted under 35 U.S.C. 154(b) by 415 days.

This patent is subject to a terminal disclaimer.

(21) Appl. No.: 12/566,520

(22) Filed: Sep. 24, 2009

(65) Prior Publication Data

US 2010/0062235 A1    Mar. 11, 2010

Related U.S. Application Data

(63) Continuation-in-part of application No. 12/016,118, filed on Jan. 17, 2008, now Pat. No. 7,807,260.

(60) Provisional application No. 61/099,656, filed on Sep. 24, 2008, provisional application No. 60/885,374, filed on Jan. 17, 2007.

(51) Int. Cl.
*B32B 5/32* (2006.01)
*B32B 5/14* (2006.01)
*B32B 27/06* (2006.01)

(52) U.S. Cl.
CPC ..................................... *B32B 27/06* (2013.01)
USPC .................. 428/316.6; 428/318.8; 428/310.5; 428/315.5; 428/315.7; 428/314.4; 428/314.8; 428/36.5; 428/36.91

(58) Field of Classification Search
USPC .......... 428/316.6, 310.5, 315.5, 315.7, 318.8, 428/36.5, 36.91, 314.4, 314.8
See application file for complete search history.

(56) References Cited

U.S. PATENT DOCUMENTS 1,948,568 A    2/1934    De
2,317,448 A    4/1943    Dreyfus
(Continued)

FOREIGN PATENT DOCUMENTS

EP    0371392    6/1990
EP    1055499 A1    11/2000
(Continued)

OTHER PUBLICATIONS

European Patent Office—Supplementary European Search Report Dated September 6, 2010, for EP Patent Application No. 08705986.

(Continued)

*Primary Examiner* — Hai Vo
(74) *Attorney, Agent, or Firm* — John M Janeway; Janeway Patent Law PLLC

(57) ABSTRACT

The invention relates to foamed thermoplastic material articles of manufacture having an internal layered cellular structure (with segmented and varying physical properties across one or more dimensions). In one embodiment, the invention is directed to a multi-layer foamed polymeric article of manufacture having a plurality of discrete physical properties segmented across one or more dimensions, comprising: a non-laminated multi-layer polymeric object having at least one discrete outer layer positioned adjacent to a plurality of discrete inner foamed layers, wherein the at least one discrete outer layer and the plurality of discrete inner foamed layers are integral with one another, and wherein the at least one discrete outer layer has an outer layer physical property and each of the plurality of discrete inner foamed layers has a respective inner foamed layer physical property, wherein the outer layer physical property and the inner foamed layer physical property are different from each other.

27 Claims, 17 Drawing Sheets

(56) References Cited

U.S. PATENT DOCUMENTS

| | | | |
|---|---|---|---|
| 2,629,312 A | 2/1953 | Diablo | |
| 3,244,537 A | 4/1966 | Cease | |
| 3,260,781 A | 7/1966 | Lux | |
| 3,610,000 A | 10/1971 | Lopata | |
| 3,617,311 A | 11/1971 | Beltle et al. | |
| 3,744,402 A | 7/1973 | Piegza | |
| 3,846,526 A | 11/1974 | Wade | |
| 3,883,625 A | 5/1975 | Thomas et al. | |
| 3,895,911 A | 7/1975 | Prins | |
| 3,937,777 A | 2/1976 | Wienand | |
| 3,955,482 A | 5/1976 | Moen | |
| 4,003,302 A | 1/1977 | Mencacci | |
| 4,074,941 A | 2/1978 | Jablonski | |
| 4,284,596 A | 8/1981 | Inokuchi | |
| 4,304,747 A | 12/1981 | Lake | |
| 4,335,606 A | 6/1982 | Saulsbury | |
| 4,386,188 A | 5/1983 | Grancio | |
| 4,424,287 A | 1/1984 | Johnson | |
| 4,456,571 A | 6/1984 | Johnson | |
| 4,473,665 A | 9/1984 | Martini-Vvedensky | |
| D277,632 S | 2/1985 | Staufenberg | |
| 4,608,009 A | 8/1986 | Whiteside | |
| 4,693,856 A | 9/1987 | Rubens | |
| 4,756,091 A | 7/1988 | Van Denend | |
| 4,761,256 A | 8/1988 | Hardenbrook et al. | |
| 4,848,543 A | 7/1989 | Doboze | |
| 4,911,869 A | 3/1990 | Meyer et al. | |
| 4,981,631 A | 1/1991 | Cheung | |
| 5,128,202 A | 7/1992 | Subramanian | |
| 5,145,107 A | 9/1992 | Silver | |
| 5,158,986 A | 10/1992 | Cha | |
| 5,160,674 A | 11/1992 | Colton | |
| 5,172,443 A | 12/1992 | Christ | |
| 5,182,307 A | 1/1993 | Kumar | |
| 5,207,008 A | 5/1993 | Wimberger | |
| 5,217,660 A | 6/1993 | Howard | |
| 5,223,545 A | 6/1993 | Kumar | |
| 5,303,484 A | 4/1994 | Hagen | |
| 5,332,620 A * | 7/1994 | Hayashi et al. | 428/316.6 |
| 5,334,356 A | 8/1994 | Baldwin | |
| 5,362,436 A | 11/1994 | Wagner | |
| 5,364,696 A | 11/1994 | Wagner | |
| 5,369,135 A | 11/1994 | Campbell | |
| 5,437,846 A | 8/1995 | Roumagnac | |
| 5,640,784 A | 6/1997 | Rochelau | |
| 5,684,055 A | 11/1997 | Kumar et al. | |
| 5,723,510 A | 3/1998 | Kabumoto | |
| 5,747,085 A | 5/1998 | Veltman | |
| 5,783,610 A * | 7/1998 | Fukushima et al. | 521/51 |
| 5,835,657 A | 11/1998 | Suarez | |
| 5,844,731 A | 12/1998 | Kabumoto | |
| 5,867,920 A | 2/1999 | Rogne | |
| 5,904,946 A | 5/1999 | Kemp | |
| 5,955,014 A | 9/1999 | Raukola | |
| 6,012,583 A | 1/2000 | Ramirez | |
| 6,235,380 B1 | 5/2001 | Tupil | |
| 6,403,663 B1 | 6/2002 | DeSimone | |
| D476,861 S | 7/2003 | Zettle | |
| 6,656,671 B1 | 12/2003 | Alyward | |
| 6,884,377 B1 | 4/2005 | Burnham | |
| 6,884,823 B1 | 4/2005 | Pierick et al. | |
| 6,948,378 B2 | 9/2005 | Solberg | |
| 7,083,849 B1 | 8/2006 | Albrecht et al. | |
| 7,501,175 B2 | 3/2009 | Branch et al. | |
| 7,585,439 B2 | 9/2009 | Branch et al. | |
| 7,699,216 B2 | 4/2010 | Smith et al. | |
| 7,807,260 B2 | 10/2010 | Nadella et al. | |
| 2002/0168509 A1 | 11/2002 | DeSimone | |
| 2003/0130364 A1 | 7/2003 | Vo | |
| 2004/0005449 A1 | 1/2004 | Sugimoto | |
| 2005/0035495 A1 | 2/2005 | Baker | |
| 2005/0058824 A1 | 3/2005 | Fujimoto | |
| 2005/0181196 A1 | 8/2005 | Alyward | |
| 2005/0203198 A1 | 9/2005 | Branch | |
| 2006/0073298 A1 | 4/2006 | Hutchinson et al. | |
| 2006/0144915 A1 | 7/2006 | Sadlier | |
| 2006/0257606 A1 | 11/2006 | Branch | |
| 2006/0284331 A1 | 12/2006 | Branch | |
| 2007/0045175 A1 * | 3/2007 | Jang et al. | 210/500.36 |
| 2008/0274346 A1 | 11/2008 | Miller | |
| 2008/0277817 A1 | 11/2008 | Miller | |
| 2008/0280123 A1 | 11/2008 | Miller | |
| 2009/0065136 A1 | 3/2009 | Nadella | |
| 2009/0104420 A1 | 4/2009 | Nadella | |
| 2010/0062235 A1 | 3/2010 | Nadella et al. | |
| 2011/0081524 A1 * | 4/2011 | Nadella et al. | 428/174 |

FOREIGN PATENT DOCUMENTS

| | | |
|---|---|---|
| EP | 1636008 A2 | 12/2004 |
| JP | 11080408 | 3/1999 |
| JP | 11-170288 | 6/1999 |
| WO | WO 01-36521 A2 | 5/2001 |
| WO | WO2004010472 | 2/2004 |
| WO | WO2004103675 | 2/2004 |

OTHER PUBLICATIONS

Arora, Kelyn Anne; "Preparation and characterizatin of microcellular polystyrene foams processed in supercritical carbon dioxide"; Macromolecules 1998, 31, 4614-4620.

Young, "Polymer-Solvent Phase Separation as a Route to Low Density, Microcellular Plastic Foams", Journal of Cellular Plastics, 1987. 23(1): p. 55.

Kumar, "A model for the unfoamed skin on microcellular foams", 1994, Polymer Engineering & Science 34(3) pp. 169-173.

Holl "A steady-state mass balance model of the polycarbonate CO2 System", 2001, Journal of Polymer Science Part B, vol. 39 p. 868-880.

Kumar, "A process for making thermoplastic parts", 1990, 30(20), Polymer Engineering and Science, Oct. 1990, p. 1323-1329.

Kumar, "Semi-continuous production of solid state PET foams," Society of Plastics Engineers Conference Proceedings, 1995, vol. II, pp. 2189-2192.

Holl "An in situ study of plasticization of polymers by high-pressure gases", 1998, Journal of Polymer Science Part A: polymer chemistry 36(6) p. 977-982.

Yousefpour, "Fusion bonding/welding of thermoplastic composites", Journal of Thermoplastic Composite Materials Jul. 2004 vol. 17 No. 4 303-341.

Goel, "Generation of Microcellular Polymers using Supercritical CO2", Cellular Polymers: Heriot-Watt University, Mar. 23-25, 1993, p. 25.

Seeler, "Net-shape sintered microcelluler foam parts, SPE Technical Papers", vol. XLIII, 1997, pp. 2032-2036.

* cited by examiner

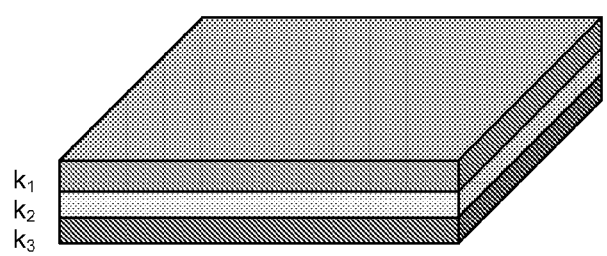
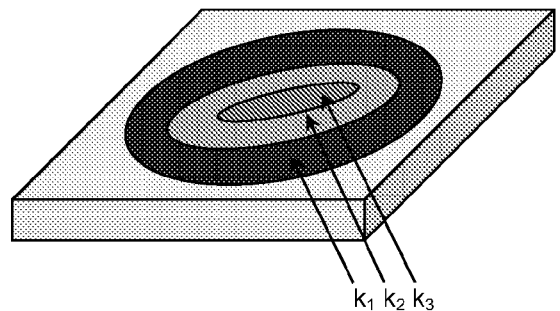
Figure 15a          Figure 15b
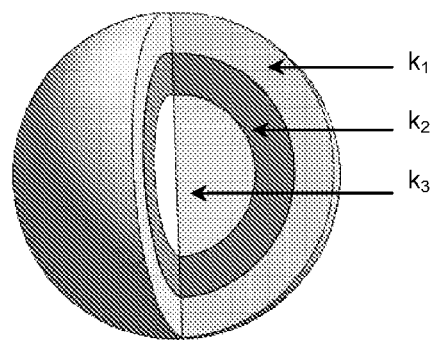
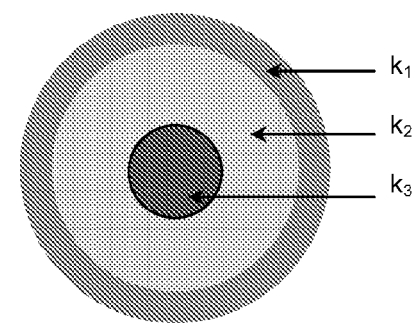
Figure 15c          Figure 15d

MULTI-LAYERED FOAMED POLYMERIC OBJECTS HAVING SEGMENTED AND VARYING PHYSICAL PROPERTIES AND RELATED METHODS

CROSS-REFERENCE TO RELATED APPLICATIONS

This application is a continuation-in-part of U.S. application Ser. No. 12/016,118 (now U.S. Pat. No. 7,807,260) filed on 17 Jan. 2008, which patent claims the benefit of U.S. Provisional Application No. 60/885,374 filed on 17 Jan. 2007, and U.S. Provisional Application No. 60/886,506 filed on 24 Jan. 2007, both of which are incorporated herein by reference in their entireties for all purposes. This application also claims the benefit of U.S. Provisional Application No. 61/099,656 filed on 24 Sep. 2008, which application is incorporated herein by reference in its entirety for all purposes.

JOINT RESEARCH AGREEMENT

The University of Washington and Microgreen Polymers, Inc. are parties to a joint research agreement within the meaning of 35 USC 100(h) and §1.9(e).

JOINT RESEARCH AGREEMENT The University of Washington and Microgreen Polymers, Inc. are parties to a joint research agreement within the meaning of 35 USC 100(h) and §1.9(e).

TECHNICAL FIELD

The present invention relates generally to foamed plastic materials and, more specifically, to microcellular foamed thermoplastic material articles of manufacture having a multi-layered structure with segmented and varying physical properties across one or more dimensions, as well as to methods of making and using such polymeric articles.

BACKGROUND OF THE INVENTION

Microcellular plastic foam refers to a polymer that has been specially foamed so as to create micro-pores or cells (also sometime referred to as bubbles). The common definition includes foams having an average cell size on the order of 10 microns in diameter, and typically ranging from about 0.1 to about 100 microns in diameter. In comparison, conventional plastic foams typically have an average cell diameter ranging from about 100 to 500 microns. Because the cells of microcellular plastic foams are so small, to the casual observer these specialty foams generally retain the appearance of a solid plastic.

Microcellular plastic foams can be used in many applications such as, for example, insulation, packaging, structures, and filters (D. Klempner and K. C. Fritsch, eds., *Handbook of Polymeric Foams and Foam Technology*, Hanser Publishers, Munich (1991)). Microcellular plastic foams have many unique characteristics. Specifically, they offer superior mechanical properties at reduced material weights and costs.

The process of making microcellular plastic foams has been developed based on a thermodynamic instability causing cell nucleation (J. E. Martini, SM Thesis, Department of Mech. Eng., MIT, Cambridge, Mass. (1981)). First, a polymer is saturated with a volatile foaming agent at a high pressure. Then, by means of a rapid pressure drop, the solubility of foaming agent impregnated within the polymer is decreased, and the polymer becomes supersaturated. The system is heated to soften the polymer matrix and a large number of cells are nucleated. The foaming agent diffuses both outwards and into a large number of small cells. Stated somewhat differently, microcellular plastic foam may be produced by saturating a polymer with a gas or supercritical fluid and using a thermodynamic instability, typically a rapid pressure drop, to generate billions of cells per cubic centimeter (i.e., bubble density of greater than $10^8$ cells per cubic centimeter) within the polymer matrix.

There are several patents and patent publications that disclose various aspects of microcellular plastic foam and processes for making the same. Exemplary in this regard are the following:

U.S. Pat. No. 4,473,665 to Martini-Vvedensky et al. (issued Sep. 25, 1984) discloses microcellular plastic foams and related methods. In this patent, a batch process is disclosed in which a plastic sheet or other article is impregnated with an inert gas under pressure; the pressure is reduced to ambient; the plastic sheet or article is heated to a softening point to initiate bubble nucleation and foaming; and when the desired degree of foaming has been achieved, the plastic sheet or article is quenched to terminate foaming. The resulting product is a microcellular plastic foam having uniformly distributed cells all of about the same size.

U.S. Pat. No. 4,761,256 to Hardenbrook et al. (issued Mar. 1, 1998) discloses a process in which a web of plastic material is impregnated with an inert gas and the gas is diffused out of the web in a controlled manner. The web is reheated at a station external to the extruder to induce foaming, wherein the temperature and duration of the foaming process is controlled so as to produce uniformly distributed cells. The process is designed to provide for the continuous production of microcellular foamed plastic sheet.

U.S. Pat. No. 5,158,986 to Cha et al. (issued Oct. 27, 1992) discloses the formation of microcellular plastic foams by using a supercritical fluid as a blowing agent. In a batch process, a plastic article is submerged at pressure in a supercritical fluid for a period of time, and then quickly returned to ambient conditions so as to create a solubility change and nucleation. In a continuous process, a polymeric sheet is extruded, which can be run through rollers in a container of supercritical fluid at pressure, and then exposed quickly to ambient conditions. In another continuous process, a supercritical fluid-saturated molten polymeric stream is established. The polymeric stream is rapidly heated, and the resulting thermodynamic instability (solubility change) creates sites of nucleation (while the system is maintained under pressure to prevent significant cell growth). The polymeric stream is then injected into a mold cavity where pressure is reduced and cells are allowed to grow.

U.S. Pat. No. 5,684,055 to Kumar et al. (issued Nov. 4, 1997) discloses a method for the semi-continuous production of microcellular foam articles. In a preferred embodiment, a roll of polymer sheet is provided with a gas channeling means interleaved between the layers of polymer. The roll is exposed to a non-reacting gas at elevated pressure for a period of time sufficient to achieve a desired concentration of gas within the polymer. The saturated polymer sheet is then separated from the gas channeling means and bubble nucleation and growth is initiated by heating the polymer sheet. After foaming, bubble nucleation and growth is quenched by cooling the foamed polymer sheet.

Although much progress has made with respect to the development of microcellular foamed thermoplastic material objects and articles of manufacture, there is still a need in the art for new and different types of foamed plastic materials. The present invention fulfills these needs and provides for further related advantages.

SUMMARY OF THE INVENTION

In brief, the present invention is directed to foamed thermoplastic material articles of manufacture having an internal layered cellular structure (with segmented and varying physical properties across one or more dimensions), as well as to methods of making and using the same. In one embodiment, the invention is directed to a multi-layer foamed polymeric article of manufacture having a plurality of discrete physical properties segmented across one or more dimensions, comprising: a non-laminated multi-layer polymeric object having at least one discrete outer layer positioned adjacent to a plurality of discrete inner foamed layers, wherein the at least one discrete outer layer and the plurality of discrete inner foamed layers are integral with one another, and wherein the at least one discrete outer layer has an outer layer physical property and each of the plurality of discrete inner foamed layers has a respective inner foamed layer physical property, wherein the outer layer physical property and the inner foamed layer physical property are different from each other. The thermoplastic material may be a semi-crystalline polymer such as, for example, PET (polyethylene terephthalate), PEEK (polyetheretherketone), PEN (polyethylene napthalate), PBT (polybutylene terephthalate), PLA (polyactide), or blends thereof. The thermoplastic material may be an amorphous polymer such as, for example, PEI (polyetherimide), PEKK (polyetherketoneketone), polycarbonate, and blends thereof. The two outer layers may be unfoamed skin layers having smooth outer surfaces, and the discrete inner foamed layers may be microcellular.

In another embodiment, the present invention is directed to a multi-layer polymeric article of manufacture, comprising: a non-laminated multi-layer thermoplastic object having at least one discrete outer skin layer, at least one first inner foamed layer, and at least one second inner solid layer, wherein the at least one outer skin layer and the first and second inner layers are integral with one another, and wherein the first and second inner layers each has a thickness greater than the thickness of the outer skin layer, and wherein the first inner foamed layer is populated with microcellular bubbles of about the same size and shape, and wherein the first inner foamed layer is positioned between and immediately adjacent to the outer skin layer and the second inner solid layer.

In yet another embodiment, the present invention is directed to a multi-layer polymeric article of manufacture, comprising: a non-laminated multi-layer thermoplastic material object having at least one first outer skin layer having a first dielectric constant, at least one second inner foamed layer having a second dielectric constant, and at least one third inner foamed layer having a third dielectric constant, wherein the at least one first outer skin layer and the second and third inner foamed layers are integral with one another, and wherein the first and second inner foamed layers each has a thickness greater than the thickness of the outer skin layer, and wherein the first dielectric constant is greater than the second dielectric constant, and wherein the second dielectric constant is great than the third dielectric constant.

These and other aspects of the present invention will become more evident upon reference to the following detailed description and attached drawings. It is to be understood, however, that various changes, alterations, and substitutions may be made to the specific embodiments disclosed herein without departing from their essential spirit and scope.

In addition, it is expressly provided that all of the various references cited herein are incorporated herein by reference in their entireties for all purposes.

BRIEF DESCRIPTION OF THE DRAWINGS

In the drawings like reference numerals are used to designate like features throughout the several views of the drawings. In addition, it should be noted that because the partial cross-sectional views (associated with certain scanning electron micrographs) were obtained by "scoring" a sample coupon, and then breaking the sample coupon along the indented score line, an artifact denoted by the symbol A is present. Artifact A is not a separate layer; rather, it is the result of having a non-planar portion of the cross-sectional view corresponding to the depth of the score line.

FIG. 15a depicts a multi-layer sheet having three discrete layers (stacked on top of each other in the thickness direction) each of which has a different dielectric constant, wherein $k_1 > k_2 > k_3$.

FIG. 15b depicts a multi-layer sheet having three discrete inner layers (radially positioned apart from each other in the lengthwise direction) each of which has a different dielectric constant, wherein $k_1 > k_2 > k_3$.

FIG. 15c depicts a multi-layer sphere having three discrete inner layers (concentrically positioned apart from each other about a center point) each of which has a different dielectric constant, wherein $k_1 > k_2 > k_3$.

FIG. 15d depicts a multi-layer cylinder (side and end views) having three discrete inner layers (concentrically positioned apart from each other about a central longitudinal axis) each of which has a different dielectric constant, wherein $k_1 > k_2 > k_3$.

DETAILED DESCRIPTION OF THE INVENTION

The present invention is directed to foamed thermoplastic material articles of manufacture having an internal layered microcellular structure (with segmented and varying physical properties across one or more dimensions), as well as to methods of making and using the same. In the several embodiments disclosed herein, the multi-layer foamed polymeric articles of manufacture are generally described in the context of transforming a solid monolithic sheet of a PET (polyethylene terephthalate) thermoplastic material; however, it is to be understood that other semi-crystalline polymers such as, for example, PEEK (polyetheretherketone), PEN (polyethylene napthalate), PBT (polybutylene terephthalate), PMMA (polymethyl methacrylate), and PLA (polyactide), as well as various polymeric blends thereof, are contemplated and within the scope of the invention. Moreover, and as appreciated by those skilled in the art, PET is understood to be inclusive of both RPET (recycled polyethylene terephthalate) and CPET (crystallizing polyethylene terephthalate). In addition, it is also to be understood that amorphous polymers such as, for example, PEI (polyetherimide), PEKK (polyetherketoneketone), polycarbonate, and blends thereof, are also contemplated and within the scope of the invention.

An important aspect of the present invention is the ability to manufacture a multi-layer foamed polymeric article of manufacture having a plurality of discrete physical properties segmented across one or more dimensions corresponding to the different layers formed from a solid monolithic starting material such as a polymeric sheet or shaped object. The physical properties that can be segmented across one or more dimensions include, for example, relative static permittivity, specific heat capacity, density, void space, and stiffness. As used herein, the relative static permittivity (or dielectric constant (k)) of a material under given conditions is a measure of the extent to which it concentrates electrostatic lines of flux; thus, it is the ratio of the amount of stored electrical energy when a potential is applied, relative to the permittivity of a vacuum. Specific heat capacity (or specific heat (c)), on the other hand, is the measure of the heat energy required to increase the temperature of a unit quantity of a substance by unit degree.

Figure 1:
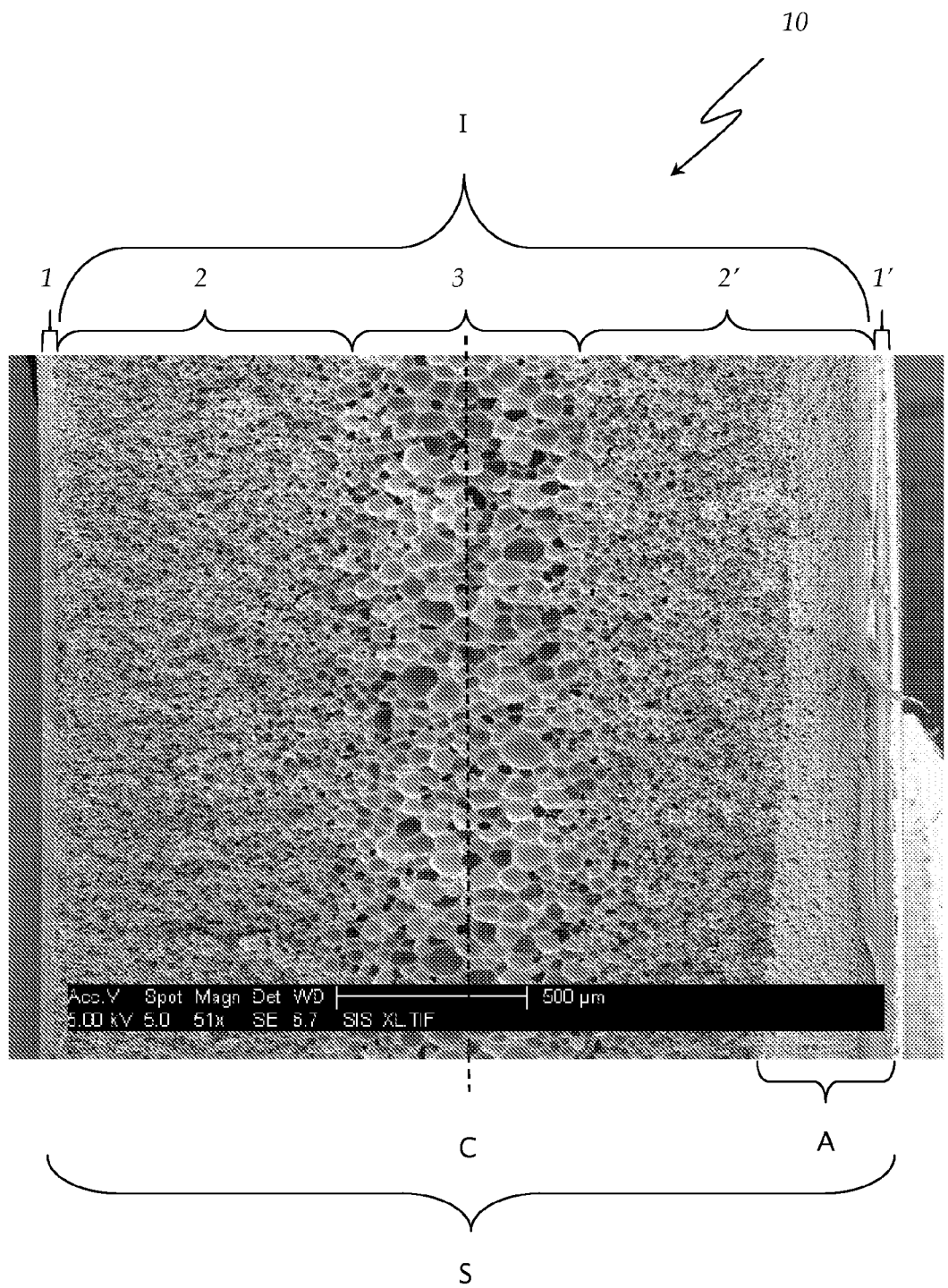
FIG. 1 is a scanning electron micrograph showing a partial cross-sectional view of a thermoformed circular coupon of RPET (3.8 cm diameter×0.107 cm) exhibiting a multi-layer foamed structure in accordance with an embodiment of the present invention.

Thus, and in view of foregoing and with reference to FIG. 1, the invention in one embodiment is directed to a multi-layer foamed polymeric article of manufacture 10 made from a solid monolithic sheet of a semi-crystalline polymer; namely, PET. As shown, the multi-layer foamed polymeric article of manufacture 10 comprises a multi-layer thermoplastic material sheet S having first and second discrete outer layers 1, 1' sandwiching a plurality of discrete inner foamed layers I. In this embodiment, the first and second discrete outer layers 1, 1' are substantially identical with each other. The first and second discrete outer layers 1, 1' and the plurality of discrete inner foamed layers I are also integral with one another, meaning that they are not laminated together. As further shown, the outer layers 1, 1' are each unfoamed skin layers having smooth outer surfaces, and each of the plurality of discrete inner foamed layers I are microcellular.

The plurality of discrete inner foamed layers I in this embodiment include two substantially identical second inner foamed layers 2, 2' positioned immediately adjacent to the first and second discrete outer layers 1, 1', respectively. The second inner foamed layers 2, 2' each include a first plurality of closed cells as shown, wherein the first plurality of closed cells has an average cell diameter ranging from about 5 to about 10 microns. The plurality of discrete inner foamed layers I further include a third inner foamed layer 3 positioned immediately adjacent to and interposed between the second inner foamed layers 2, 2'. The third inner foamed layer 3 includes a second plurality of closed cells as shown, wherein the second plurality of closed cells has an average cell diameter ranging from about 30 to about 50 microns. Finally, the outer layers 1, 1' and the plurality of discrete inner foamed layers I are generally symmetrically disposed about a central axis C. (Note: Because the partial cross-sectional view of FIG. 1 was obtained by "scoring" a circular coupon along its diameter and then breaking along the indented score line, an artifact A is present. Artifact A is not a separate layer; rather, it is the result of having a non-planar portion of the cross-sectional view corresponding to the depth of the score line.) Because the various layers of this embodiment have different thicknesses and are populated with cell structures of different average size (i.e., the various layers each have a unique morphology), the physical properties of the various layers are different from one another.

Figure 2:
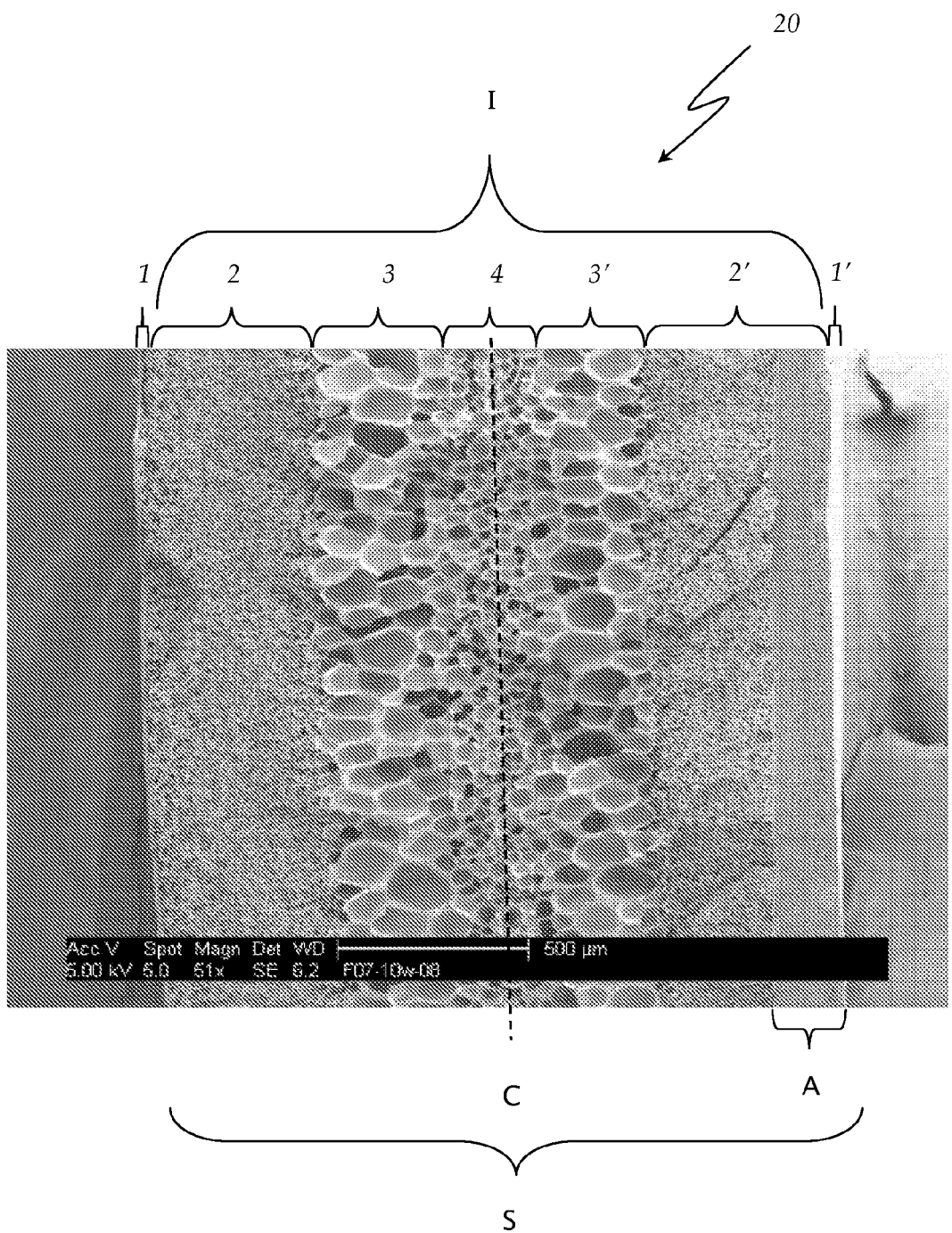
FIG. 2 is a scanning electron micrograph showing a partial cross-sectional view of a square coupon of RPET (23 cm×23 cm×0.107 cm) (taken from the base portion of a thermoformed cup) having an average relative density of about 14% and exhibiting a multi-layer foamed structure in accordance with an embodiment of the present invention.

With reference to FIG. 2, the invention in another embodiment is directed to a multi-layer foamed polymeric article of manufacture 20 made from a solid monolithic sheet of a semi-crystalline polymer; namely, PET. As shown, the multi-layer foamed polymeric article of manufacture 20 comprises a multi-layer thermoplastic material sheet S having first and second discrete outer layers 1, 1' sandwiching a plurality of discrete inner foamed layers I. In this embodiment, the first and second discrete outer layers 1, 1' are substantially identical with each other. The first and second discrete outer layers 1, 1' and the plurality of discrete inner foamed layers I are also integral with one another, meaning that they are not laminated together. As further shown, the outer layers 1, 1' are each unfoamed skin layers having smooth outer surfaces, and each of the plurality of discrete inner foamed layers I are microcellular.

The plurality of discrete inner foamed layers I in this embodiment include two substantially identical second inner foamed layers 2, 2' positioned immediately adjacent to the first and second discrete outer layers 1, 1', respectively, as well as two substantially identical third inner foamed layers 3, 3' positioned immediately adjacent to the second inner foamed layers 2, 2', respectively. The second inner foamed layers 2, 2' each include a first plurality of closed cells as shown, wherein the first plurality of closed cells has an average cell diameter ranging from about 5 to about 10 microns. Similarly, the third inner foamed layers 3, 3' each include a second plurality of closed cells as shown, wherein the second plurality of closed cells has an average cell diameter ranging from about 30 to about 50 microns. The plurality of discrete inner foamed layers I further include a fourth inner foamed layer 4 positioned immediately adjacent to and interposed between the third inner foamed layers 3, 3'. The fourth inner foamed layer 4 includes a third plurality of closed cells as shown, wherein the third plurality of closed cells has an average cell diameter ranging from about 20 to about 40 microns. Finally, the outer layers 1, 1' and the plurality of discrete inner foamed layers I are generally symmetrically disposed about a central axis C.

In another embodiment, the invention is also directed to a method for making a multi-layer foamed polymeric object as described above from a solid monolithic thermoplastic material sheet (or, alternatively, a multi-layer shaped polymeric object such as, for example, a cube, a sphere, or a cylinder starting from a solid monolithic polymer). Because the thermoplastic material sheet is preferably (but not necessarily) a semi-crystalline polymer, it has a first bulk crystallinity level that generally ranges from about 1 to about 9 percent. The method of this embodiment entails increasing the bulk crystallinity level of the thermoplastic material sheet in a serial or step-wise manner, thereby allowing for the transformation of the solid sheet into the multi-layer foamed polymeric object. More specifically, and with reference to FIG. 3, the method of this embodiment comprises an initial absorbing step 30 whereby an effective amount of a plasticizing gas (such as, for example, $CO_2$ or $N_2$) is absorbed into the thermoplastic material sheet. The absorbing step 30 is generally accomplished by placing the thermoplastic material sheet into a pressure vessel, and then pressurizing the vessel to a first selected pressure, temperature, and for period of time sufficient to (1) yield a reversibly plasticized thermoplastic material sheet, and (2) induce a crystallinity change across at least the outer portions of the thermoplastic material sheet. The first selected pressure generally ranges from about 0.345 MPa to about 9.65 MPa (or more preferably about 5.2 MPa to about 7.1 MPa), and the first selected temperature generally ranges from about −20° F. to about 150° F. Depending on the selected pressure and temperature, the selected period of time generally ranges from about a few hours to well over a hundred hours.

As a result of the absorbing step 30, the plasticized thermoplastic material sheet becomes impregnated with the plasticizing gas in an amount that is generally greater than about 0.5 percent by weight, and attains a second bulk crystallinity level that is greater than the first bulk crystallinity level. In other words, the absorbing step 30 increases the bulk crystallinity of the thermoplastic material sheet because in this step the minimum gas concentration needed to induce crystallization of the thermoplastic material sheet is met or exceeded. This increase in crystallinity is generally not uniform across the thickness of the sheet because the threshold gas concentration (i.e., minimum gas concentration needed to induce a crystallinity change) across the sheet is preferably not achieved (meaning an equilibrium condition is not reached); rather, the crystallinity tends to be greatest at or near the surfaces (where the gas concentration reaches and/or exceeds the threshold gas concentration) and lowest in the middle (where the gas concentration is below the threshold gas concentration). An exemplary impregnated gas concentration profile and crystallinity profile across the thickness of an exemplary semi-crystalline thermoplastic material sheet is schematically depicted in FIGS. 5A-E.

Figure 3:
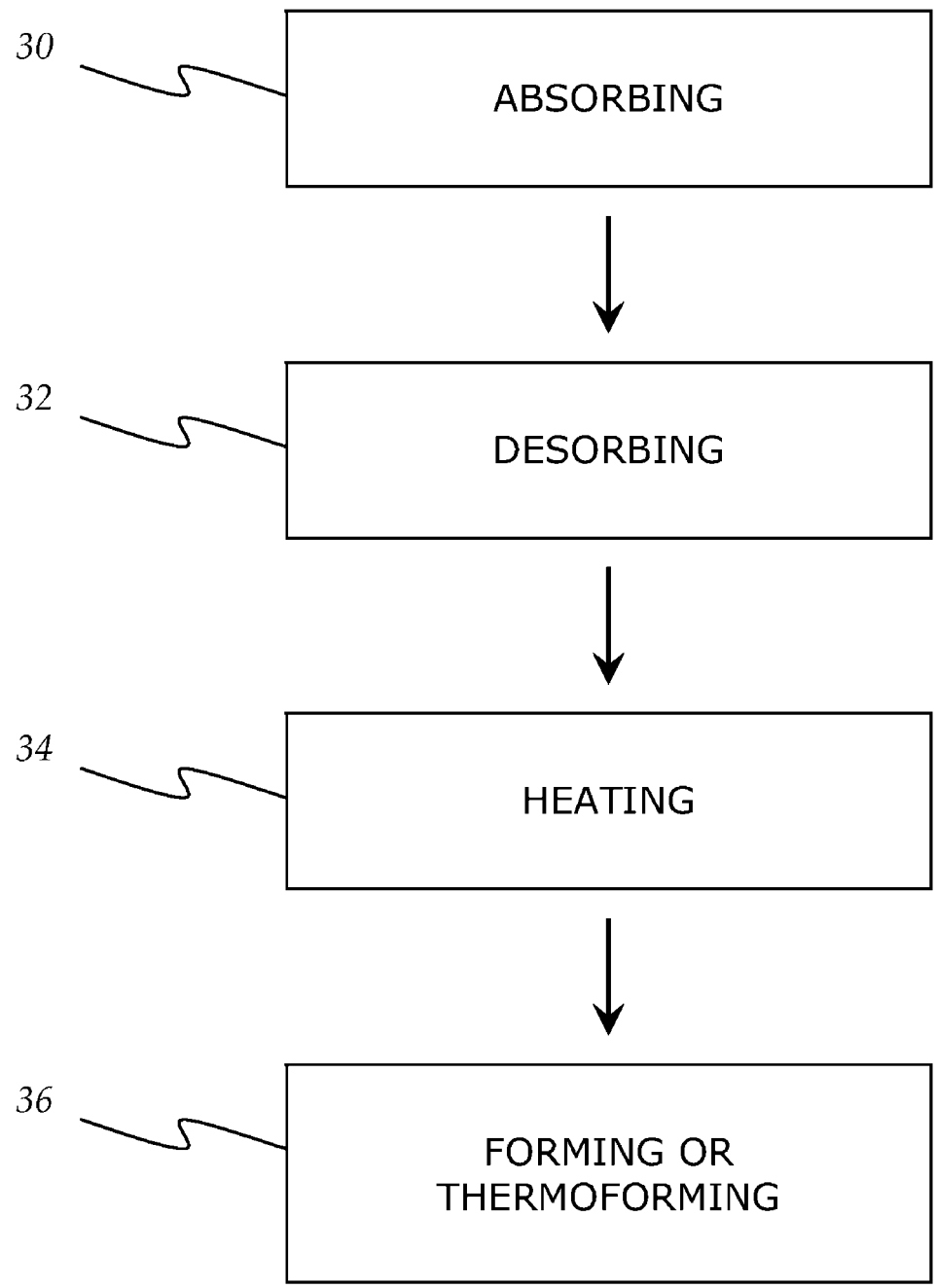
FIG. 3 is a block diagram of a method for making a multi-layer foamed polymeric object from a solid monolithic thermoplastic material sheet in accordance with an embodiment of the present invention.

After the absorbing step 30 and as further depicted in FIG. 3, the method further comprises a desorbing step 32, whereby a portion of the plasticizing gas impregnated within the thermoplastic sheet is allowed to diffuse out of the plasticized thermoplastic material sheet and into the atmosphere. Accordingly, the desorbing step 32 generally occurs by exposing the plasticized thermoplastic material sheet to a reduced pressure such as, for example, atmospheric pressure or lower. In order to further process the plasticized thermoplastic material sheet, it has been found that the plasticizing gas concentration within the thermoplastic material sheet should preferably be maintained at a level of greater than about 0.01 percent by weight. In addition, the desorbing step 32 generally occurs at a second selected temperature ranging from about −40° F. to about 150° F.

After the desorbing step 32 and as further depicted, the method further comprises a heating step 34, whereby the plasticized thermoplastic material sheet is heated in order to initiate foaming (i.e., bubble formation). In this step, the plasticizing gas impregnated within the thermoplastic sheet coalesces into a plurality of closed cells (i.e., bubbles). The heat source may be either a heated silicon oil bath or an infrared heater, for example. The heating step 34 yields a foamed thermoplastic material sheet having a third bulk crystallinity level that is greater than or equal to the second bulk crystallinity level (attained as a result of the absorbing step 30). The heating step 34 also yields a foamed thermoplastic material sheet characterized by a novel multi-layer structure (see, e.g., FIG. 1) in which first and second discrete outer layers sandwich a plurality of discrete inner foamed layers. The foamed thermoplastic material sheet may be fully foamed, or it may only be partially foamed, after the heating step 34.

Finally, and after or concurrent with the heating step 34, the method further comprises a thermoforming step 36 in which the foamed thermoplastic sheet is thermoformed in a thermoformer to yield the multi-layer foamed polymeric object. The thermoforming step 36 involves the mechanical deformation of the partially or fully foamed thermoplastic material sheet into a desired shape such as, for example, the shape of a cup or tray. As a result of the thermoforming step 36, the foamed thermoplastic material sheet attains a fourth bulk crystallinity level that is greater than or equal to the third bulk crystallinity level (attained as a result of the heating step 34).

Figure 4:
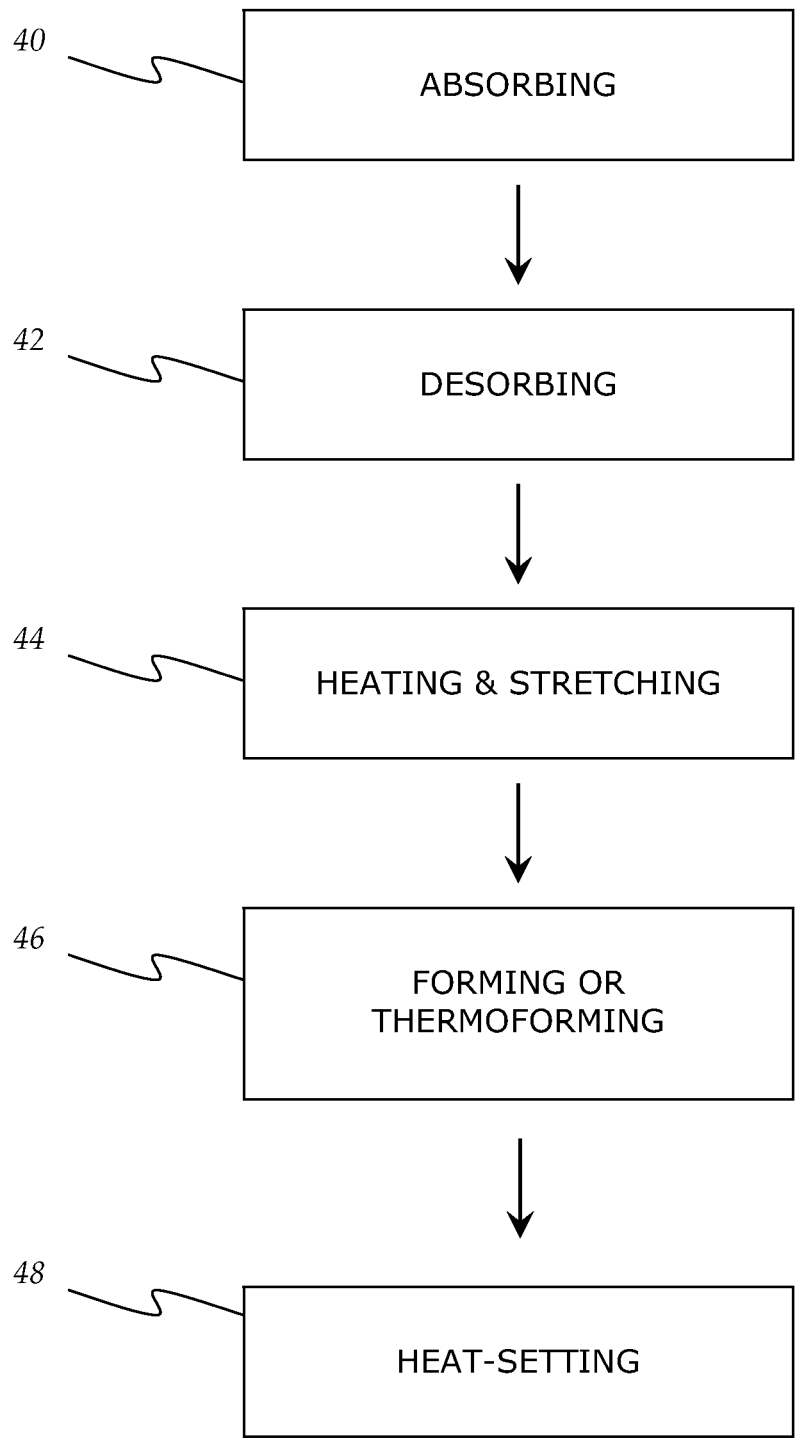
FIG. 4 is a block diagram of a method for making a shaped multi-layer foamed polymeric object from a solid monolithic thermoplastic material sheet in accordance with an embodiment of the present invention.

In yet another embodiment and with reference to FIG. 4, the present invention is directed to a method for making a shaped multi-layer foamed polymeric article of manufacture (such as, for example, a cup or tray) from a solid monolithic thermoplastic material sheet, wherein the thermoplastic material sheet has a first bulk crystallinity level. In this embodiment, the method comprises at least the following steps: (1) absorbing 40 a plasticizing gas into the thermoplastic material sheet, the step of absorbing 40 occurring at a first selected pressure, temperature, and period of time sufficient to yield a reversibly plasticized thermoplastic material sheet, the plasticized thermoplastic material sheet being impregnated with the plasticizing gas and having a second bulk crystallinity level that is greater than the first bulk crystallinity level; (2) desorbing 42 at least some of the plasticizing gas from the plasticized thermoplastic material sheet; (3) heating and mechanically stretching 44 the plasticized thermoplastic material sheet to thereby initiate foaming, the step of heating and mechanically stretching 44 occurring by transferring a selected amount of heat energy from a heat source sufficient to yield a foamed thermoplastic material sheet, the foamed thermoplastic material sheet having a third bulk crystallinity level that is greater than the first and second bulk crystallinity levels; and (4) thermoforming 46 the foamed thermoplastic material sheet in a thermoformer to yield the shaped multi-layer foamed polymeric article of manufacture (see, e.g., FIG. 2), the multi-layer foamed polymeric article of manufacture having a fourth bulk crystallinity level that is greater than or equal to the first, second, and third bulk crystallinity levels. The method may further comprise the step of heat-setting 48 the shaped multi-layer foamed polymeric article of manufacture, while in the thermoformer, to thereby further increase the bulk crystallinity of the shaped multi-layer foamed polymeric article of manufacture to a fifth bulk crystallinity level, wherein the fifth bulk crystallinity level is greater than the first, second, third, and fourth bulk crystallinity levels.

Figure 5A:
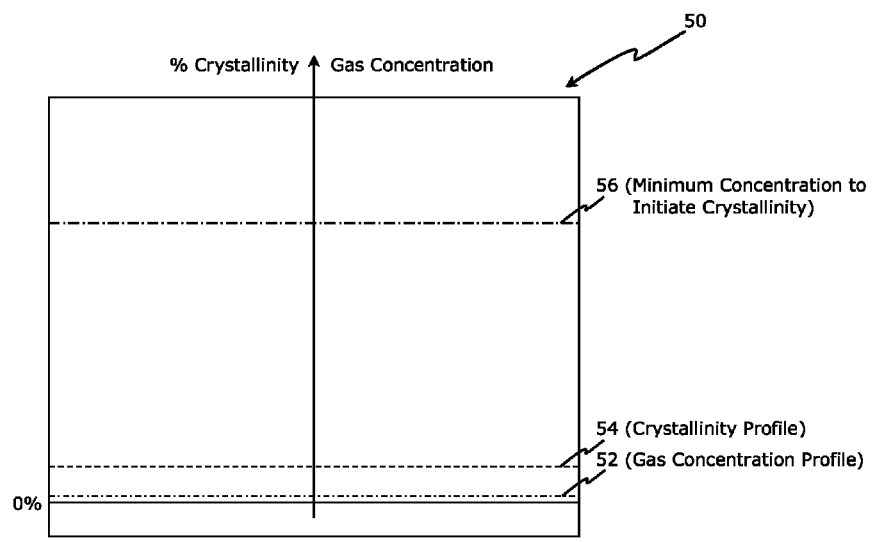
FIG. 5A is a diagram that represents a partial cross-sectional view of a thermoplastic material sheet before processing, and shows an initial and near zero uniform plasticizing gas concentration profile, an initial and uniform bulk crystallinity profile, and a threshold gas concentration profile which must be met or exceeded in order to induce a crystallinity change in the thermoplastic material sheet.
Figure 5B:
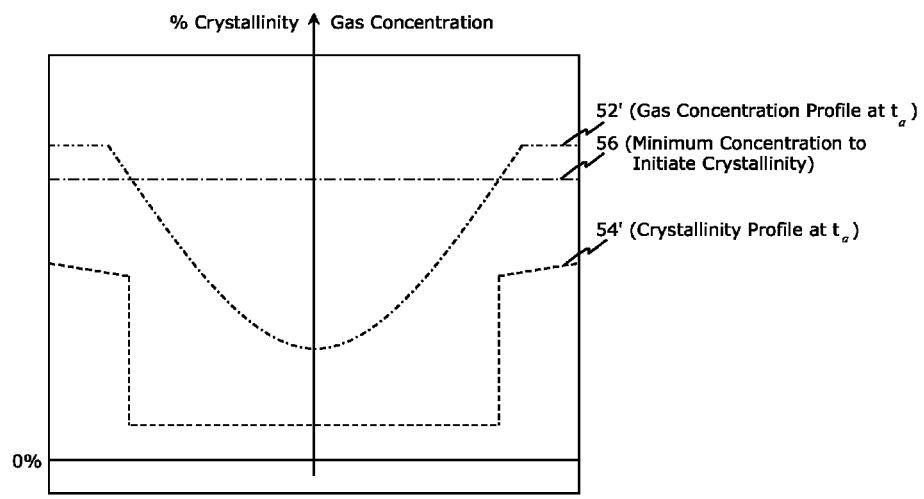
FIG. 5B is a diagram that represents a partial cross-sectional view of the thermoplastic material sheet of FIG. 5A after the step of absorbing, and shows a second plasticizing gas concentration profile that is substantially greater than the initial and near zero uniform plasticizing gas concentration profile, and a second crystallinity level achieved at the outer portions of the thermoplastic material sheet.
Figure 5C:
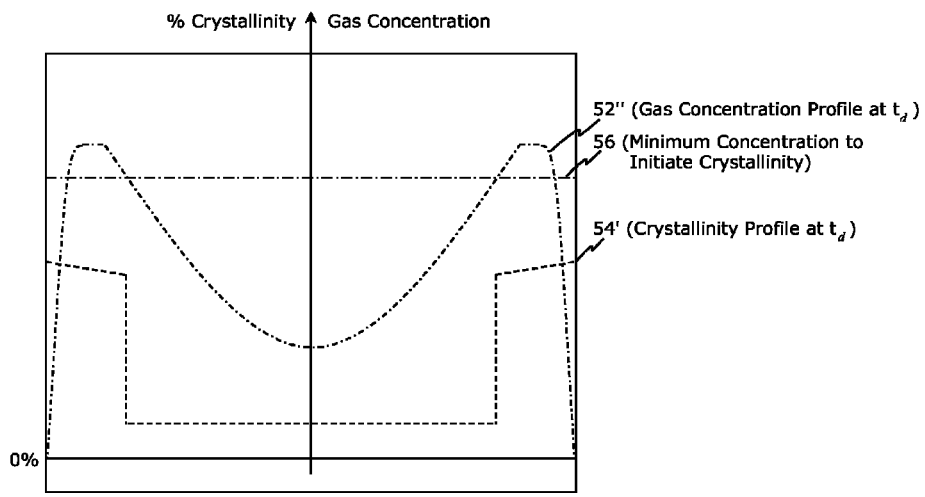
FIG. 5C is a diagram that represents a partial cross-sectional view of the thermoplastic material sheet of FIG. 5B after the step of desorbing, and shows a third plasticizing gas concentration profile wherein plasticizing gas has desorbed from the outer portions of the thermoplastic material sheet.
Figure 5D:
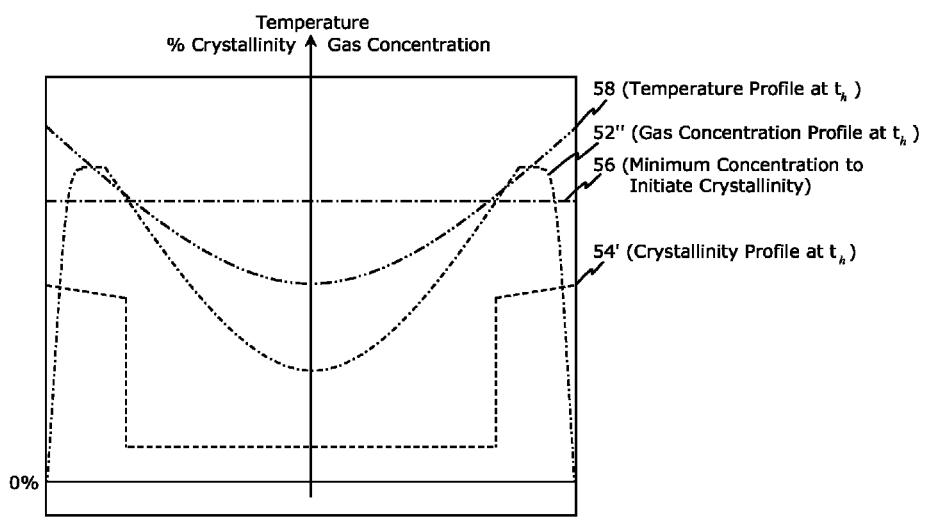
FIG. 5D is a diagram that represents a partial cross-sectional view of the thermoplastic material sheet of FIG. 5C after the step of heating, and shows a non-uniform temperature profile across the thermoplastic material sheet.
Figure 5E:
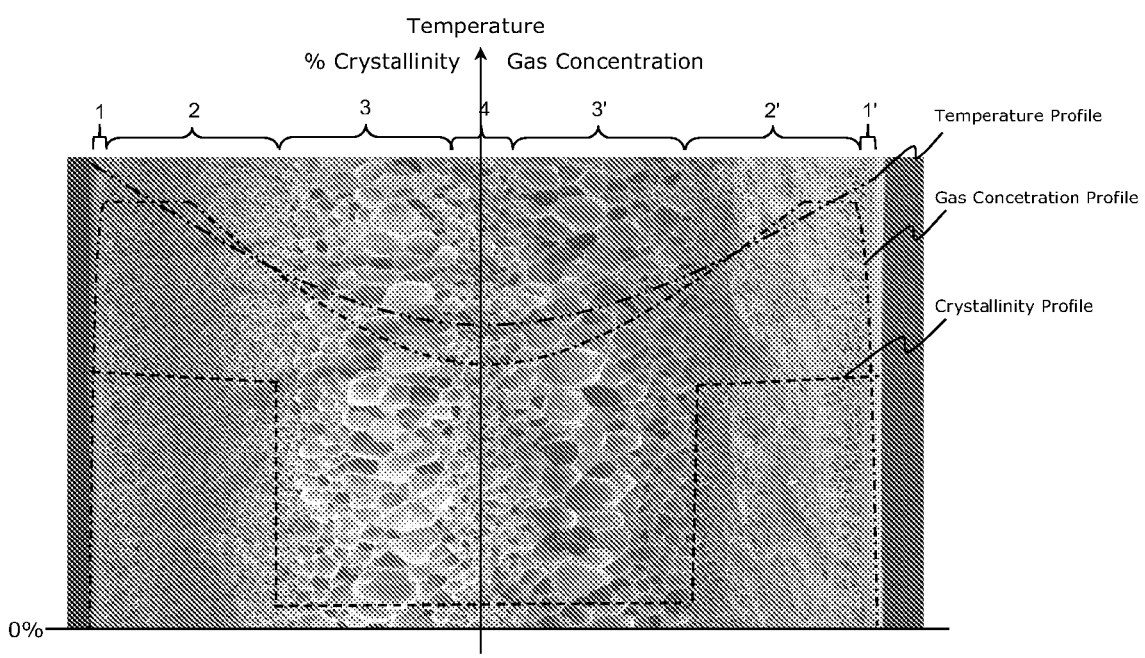
FIG. 5E is scanning electron micrograph showing a partial cross-sectional view of a thermoformed rectangular coupon of RPET (10 cm×15 cm×0.107 cm) exhibiting a multi-layer foamed structure in accordance with an embodiment of the present invention, and wherein a plasticizing gas concentration profile, a crystallinity profile, and a temperature profile have been superimposed thereon as a way to rationalize the formation of the novel structure.
Figure 6:
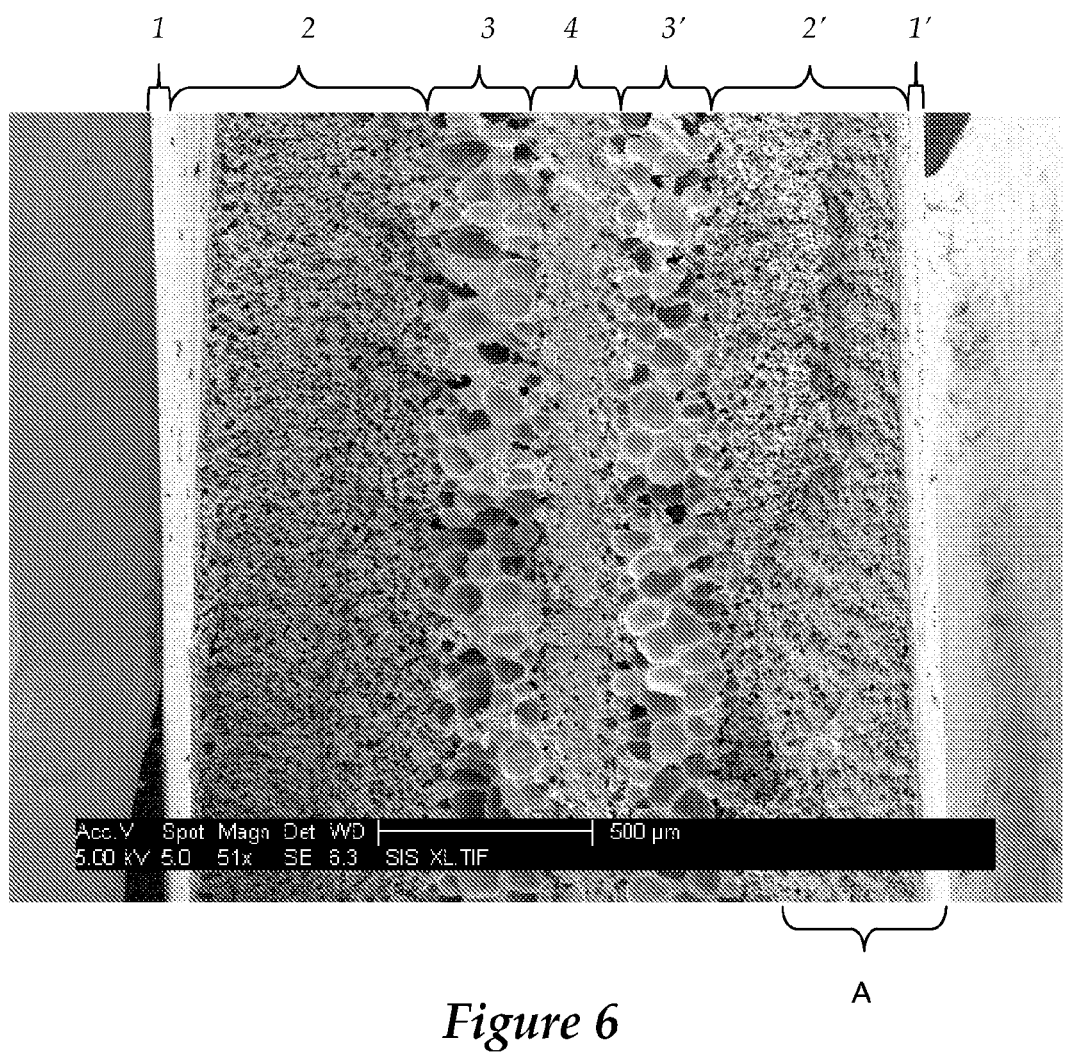
FIG. 6 is a scanning electron micrograph showing a partial cross-sectional view of a thermoformed circular coupon of RPET (3.8 cm diameter×0.107 cm) exhibiting a multi-layer foamed structure in accordance with an embodiment of the present invention.

Without necessarily prescribing to any scientific theory, it is believed that the discrete layer formation associated with each of the above-described embodiments is the result of a combination of (1) a crystallinity gradient, (2) a plasticizing gas concentration gradient, and (3) a temperature gradient, all three of which are formed across the thickness of the thermoplastic material sheet during processing. Thus, and with reference to FIGS. 5A-E (which figures depict hypothetical crystallinity, gas concentration, and temperature profiles across a thermoplastic material sheet), discrete layer formation may be rationalized in the following way. First, and as shown in FIG. 5A, a thermoplastic material sheet 50 is provided that has an initial and near zero uniform plasticizing gas concentration profile 52, and an initial and uniform bulk crystallinity profile 54 (e.g., 9% crystallinity) (also depicted is the threshold gas concentration profile 56 needed to induce a crystallinity change in the thermoplastic material sheet 50). Second, and as shown in FIG. 5B, the thermoplastic material sheet 50 is exposed under pressure to the plasticizing gas for a period of time $t_a$ (i.e., step of absorbing) to thereby form a second plasticizing gas concentration profile 52' that is substantially greater than the initial and near zero uniform plasticizing gas concentration profile 52 (with a minimum gas concentration occurring at the center axis). As a result, and because the second plasticizing gas concentration profile 52' reaches a level that is above the threshold gas concentration profile 56 at the outer portions of the thermoplastic material sheet 50, the initial crystallinity level 54 sharply increases to a second crystallinity level 54' at the outer portions of the thermoplastic material sheet 50. Third, and as shown in FIG. 5C, the thermoplastic material sheet 50 is returned to ambient conditions for a period of time $t_d$ thereby allowing some of the plasticizing gas to desorb (i.e., step of desorbing) from the outer portions of the thermoplastic material sheet 50 and form a third plasticizing gas concentration profile 52''. Fourth, the thermoplastic material sheet 50 is heated for a period of time $t_h$ to thereby initiate foaming and form a non-uniform temperature profile 58 across the thermoplastic material sheet 50 (with a minimum temperature at the center axis). Finally, the thermoplastic material sheet 50 is thermoformed thereby further increasing the bulk crystallinity level (not shown). It is believed that discrete layer formation of the semi-crystalline thermoplastic material sheet 50 (see, e.g., FIG. 5E) is the result of the interplay between these crystallinity, gas concentration, and temperature profiles. Similarly, it is also believed that discrete layer formation associated with amorphous thermoplastic materials (like PEI) is the result of the interplay between the gas concentration and temperature profiles (see generally, FIG. 12).

In another aspect, the present invention is also directed to a multi-layered foamed plastic structure having graded (i.e., a gradient of) physical properties (such as, for example, strength and stiffness, as well as relative static permittivity and specific heat capacity) across its cross-section. In this regard, it has been discovered that a multi-layered foamed plastic structure may be created that optimizes the structure's stiffness, buckling resistance, and strength for a given amount of plastic, or that varies in a step-wise manner the structure's electrical or thermal properties. The multiple layers (with each layer having a unique morphology) of such a multi-layered structure may include: (1) skins of solid material at each surface; (2) high density closed cell layers immediately adjacent to each skin layer; and (3) lower or constant density foam layers (either closed or open cells, and either with varying or constant average cell size) progressing towards the center of the multi-layer structure. The density at the inner core generally needs to be no greater than what is needed to handle the maximum shear stress induced at the neutral axis (of the cross section under a flexural load). By creating cellular layers having the greatest density foam adjacent to the surface skin layers, the moment of inertia of the cross section may be increased over the foam (with a uniform foam core of the same average density). This increased moment results in greater bending strength, greater flexural stiffness, and increased resistance to buckling for a given average density. In addition, the effective material stiffness (flexural modulus) increases with increasing density.

The Flexural Stiffness, defined as the product of the flexural modulus (E) and moment of inertia (I), allows comparison of different materials and geometries with respect to their resistance to bending. By superposition, the flexural stiffness of layered foams is $$\sum_{1}^{n}(E_n \cdot I_n).$$

Since $I_n$ increases the farther the layer is located from the cross-section's centroid, the greatest value for $$\sum_{1}^{n}(E_n \cdot I_n)$$

occurs when $E_n$ is largest for the same layer for which $I_n$ is largest (e.g., the outermost layer). The second largest $E_n$ will be paired with the next inner layer, and so on. This foam layer pattern generally allows for the greatest material efficiency under flexural loads.

A similar relationship between buckling loads may also be expressed (buckling failure also depends both on E and on the structure's geometry). The buckling load, defined as $P_{cr}=\pi^3 EI/L^2$, increases with E and I. This minimum buckling load may be determined by the structure's ability to resist bending caused by any slight misalignment of the structure's central axis with an applied load. By superposition, the same argument may be made in that $P_{cr}$ varies as $$\sum_{1}^{n}(E_n \cdot I_n).$$

Thus, for maximum material efficiency with buckling loads, the foam density of each layer should follow the same pattern as described previously for flexural loads.

Another point with regards to increasing stiffness over conventional foams is that closed cells generally do not lose their flexural modulus as quickly as open cell foams as the foam density is reduced. This is due to the trapped gas inside the cells. Thus, the stiffness generally does not reduce as quickly with density reduction as common open cell foams. Also, in foams with thin skins that are subjected to flexural or buckling loads, for maximum effectiveness, the foam underneath the skin should preferably be of sufficient strength to keep the skin aligned, and not allow the skin to separate from the core or to buckle inwardly so as to compress the foam core. The minimum layer density to meet such strength requirements may also vary with the skin thickness.

Another advantage may be found for ordinary sandwiched foams in which the outermost layer(s) may be of any material (e.g., sheet metal or solid higher modulus polymer), and which are either bonded, fused, or mechanically fastened to an ordinary polymeric foam sheet of a single density. In this case, the bond strength between the foam and the outermost layer may often the limiting factor. Material use efficiency dictates the use of lower density foam, yet higher density or even foams with solid skins are required for higher bond strengths. Thus, the advantage of using multiple layered foams with a cellular core between two skins is that the density and strength can be high at the mating line, while being progressively reduced towards the center line.

By using the monolithic foams having a solid integral skin as the core of a sandwich construction, the following advantages may result: (1) greatly increased flat surface area available for use of a thin adhesive coating (many adhesives are stronger when applied in thin layers); (2) if the outer layer of the foam core is not solid, but instead a closed small cell (less than 100 microns), great savings may still result compared to conventional sized cells due to reduced adhesive use (the alternative, using more adhesive to fill open cells on the surface or larger surface irregularities due to larger cells, requires more adhesive which adds weight and cost); (3) greatly increased surface area for fusion bonding of a polymeric solid skin to the foam when the outer layer of the foam core is unfoamed solid polymer (bonds may be solvent based or fused by friction induced heat or other means—in fact, many fusion bonds are impractical with low density foams); and (4) for mechanically bonded solid skins such as stitched bonds, clearly having a high density or even an integral skin to fasten to while having lower density monolithic inner layers creates higher bond strength with lower total material weight (the shear strength of each fastening element is generally many times higher in a solid than for a medium-density foam). In the case of thermoformed foamed objects, the art of twin sheet or triple sheet thermoforming is understood. Typically, the top and bottom skins are partially fused to the foam core due to the heat and pressure of thermoforming.

The advantages of graded foam structures may be realized for solid-state foamed polymeric objects made from raw materials in the form of rolls, sheets, thermoformed solid articles (e.g. speaker cones), as well as compression molded solid shapes. The foaming process on solid-state saturated polymeric objects may be conducted in a variety of ways, including foaming in heated liquid bath, foaming in hot air oven, foaming in infrared oven, foaming in a compression molding setup or foaming in thermoforming molds. To gain the advantages noted above, the thickness of the polymeric object being processed is preferably substantially smaller than the other dimensions. In the case of a rod shape object, the diameter is preferably substantially smaller than the length of the polymeric object being processed.

In another aspect, the present invention relates to unique multi-layered microcellular structures within a monolithic starting article that improve impedance mismatch in electrical, electronic and communications applications. For example, in antenna design for wireless communication applications, materials with different dielectric constants are usually laminated or glued to achieve certain functions. However, when encountering an interface, the signal waves are partially reflected and partially transmitted through. This will result in signal losses of up to 50% due to the impedance differences between the neighboring materials. In accordance with the present invention, the impedance mismatch can be minimized by gradually varying the density of adjacent layers within the same monolithic material using the solid-state microcellular plastics process thereby resulting in gradually varying dielectric constants throughout the monolithic structure.

For foamed structures, the dielectric constant can be controlled by varying the porosity of the foam according to the logarithmic mixture rule. To create multi-layered structures with different dielectric constant for each layer, it can be achieved by creating multi-layered structures with different porosity (void fraction) for each layer. In solid-state foaming process, the multi-layered structures with gradual transitions can be achieved. An example is the structure shown in FIG. 11. The material is recycled PET. The layered structure is composed of solid skin, high-porosity foam, and low-porosity foam. According to the mixture rule, the multi-layered structure incorporates layers with high-medium-low-medium-high dielectric constants. There are gradual transitions between the neighboring layers. This multi-layered structure with the gradually varying dielectric constants can minimize the impedance mismatch when the signal waves propagate across the structure.

Figure 12:
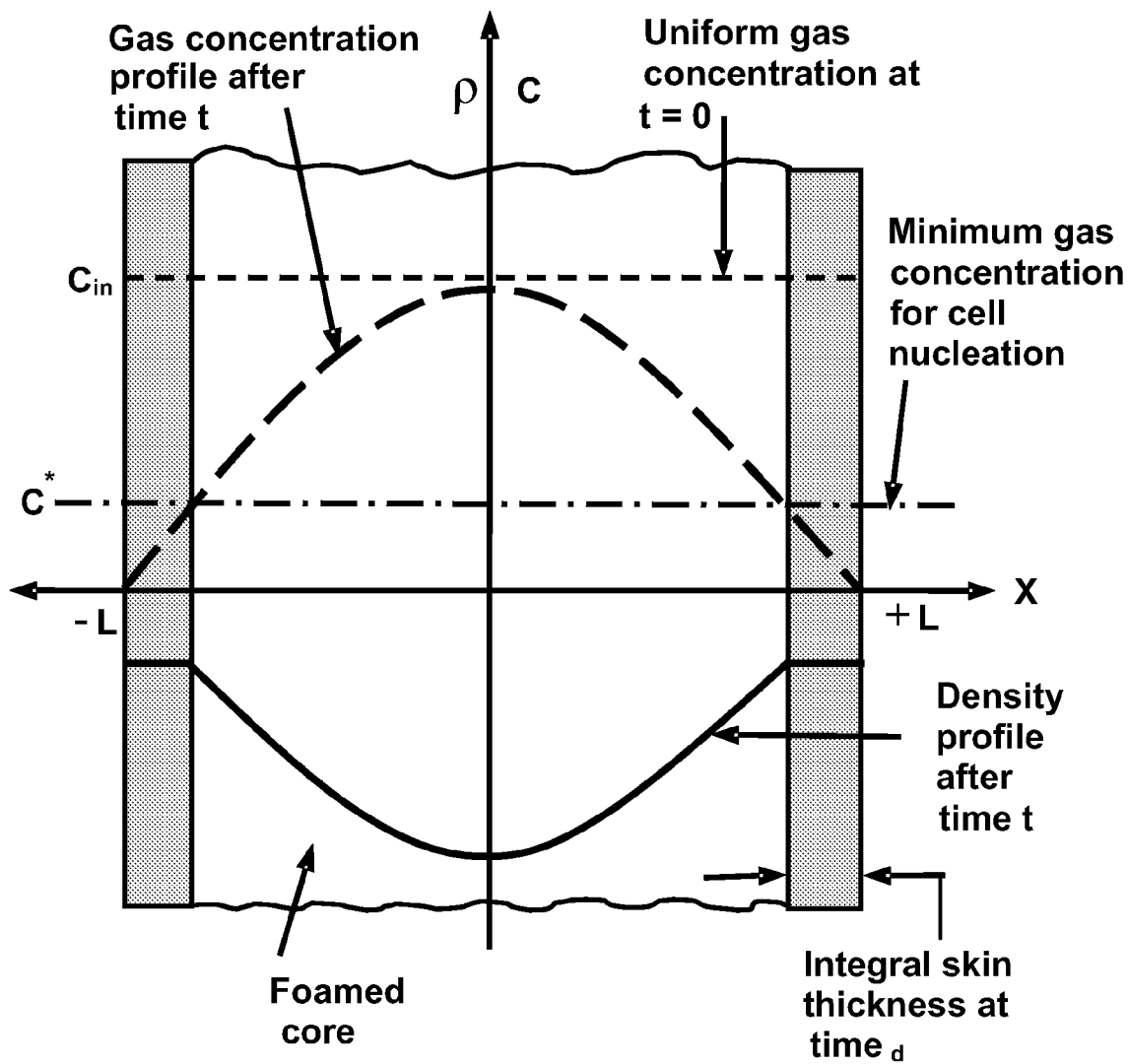
FIG. 12 is a diagram depicting the impregnated gas concentration profile and density profile (after a selected time t) across the thickness of an exemplary polymeric sheet in accordance with an embodiment of the present invention.
Figure 13:
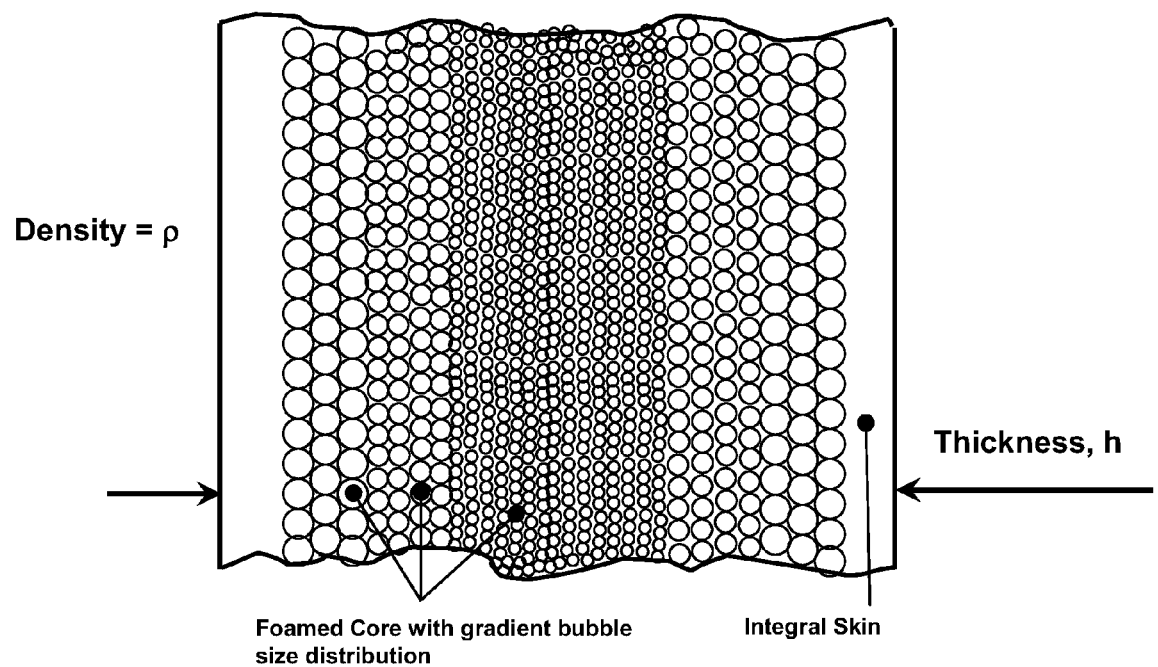
FIG. 13 is an enlarged partial cross-sectional diagram of a multi-layer foamed polymeric sample having a gradient (i.e., segmented into discrete zones) bubble size distribution across the thickness of the sample in accordance with an embodiment of the present invention.

More generally, multi-layered structures in accordance with present invention can be fabricated by creating a non-uniform gas concentration across a polymeric sample by way of saturation and desorption steps. For example, after a gas saturation step, the polymeric sample is taken out of the pressure vessel and the dissolved $CO_2$ gas diffuses out of the polymer through its surface thereby causing a concentration gradient across the thickness of the sample. FIG. 12 shows the gas concentration profiles just after the sample is removed from the pressure vessel (time zero) and at a later time t. During this time, called desorption time, the gas is allowed to escape from the surface layers. Then, if C* is the minimum gas concentration needed for bubble nucleation, one can see that there is a surface layer in which bubbles will not nucleate and remain solid due to a lack of sufficient amount dissolved gas. Further, for a fixed foaming temperature, the layers with varying gas concentrations will foam differently, resulting in a density profile shown in FIG. 12. Thus, the structure shown in FIG. 13 can be created.

Figure 14:
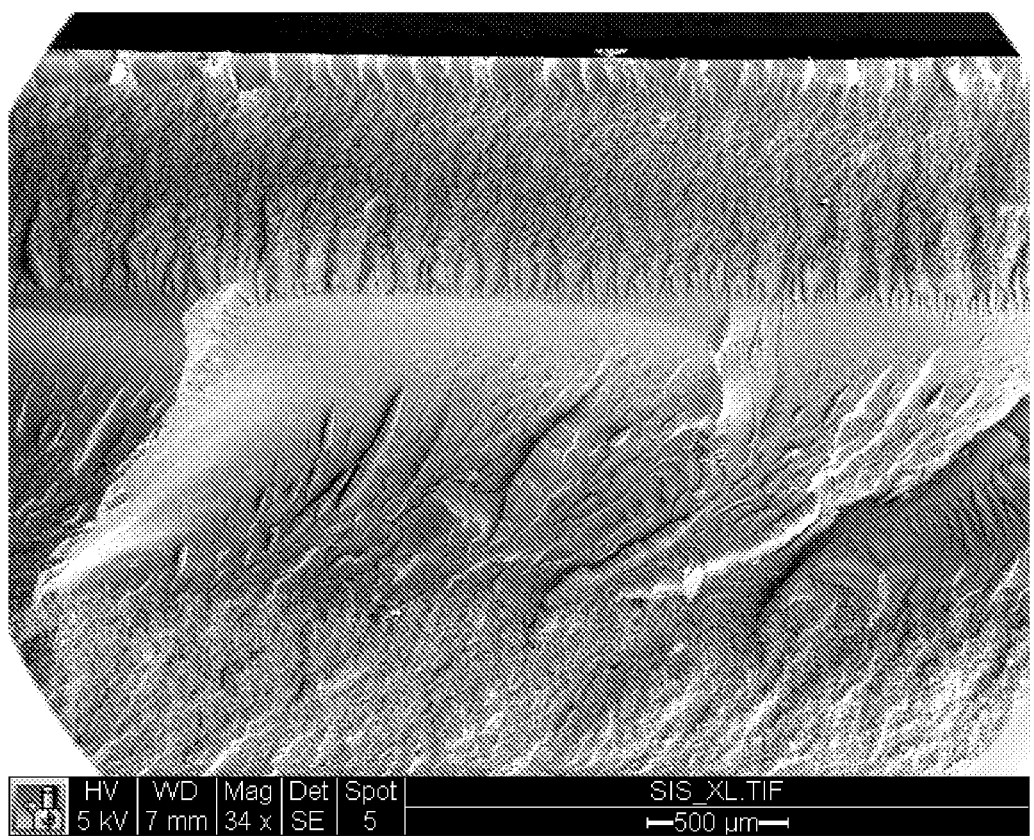
FIG. 14 is scanning electron micrograph showing a partial cross-sectional view of a processed sample of PEI exhibiting a multi-layer foamed structure (i.e., solid-foam-solid-foam-solid) in accordance with an embodiment of the present invention.

Thus, a fabrication method to create solid-foam-solid structure is disclosed (i.e., incorporates multi-layered structure with high-medium-low-medium-high dielectric constants). A similar structure can also be achieved by using non-uniform heating of gas impregnated polymeric samples. Furthermore, a solid-foam-solid-foam-solid structure can be achieved by using partial saturation and suitable desorption time. FIG. 14 shows an example of solid-foam-solid-foam-solid structure. The material is PEI (polyetherimide). The layered structure is composed of solid skin, foamed edge, and solid core. According to the mixture rule, the multi-layered structure incorporates layers with high-low-high-low-high dielectric constants. There are gradual transitions between the neighboring layers.

The multi-layered microcellular structure described above can be used in applications where layers with different dielectric constants are required. First of all, the dielectric constant of the thermoplastic foam can be modified by changing the porosity, which can be achieved in the solid-state foaming process. The limit is, however, the required dielectric constant should be between that of the gas (1 for $CO_2$) and that of solid thermoplastic polymer. Second, the thickness and porosity of each layer can be controlled in the solid-state foaming process by other ways such as non-uniform heating on various locations of the sheet.

A unique feature of the multi-layered structures described above is that the transitions between different layers are gradually formed and can minimize the impedance mismatch when the wireless signals propagate through the multi-layered structure. As noted above, the reason is that in solid-state foaming process, when gas diffuses in/out the samples in thickness direction in the saturation and desorption stage, the gas concentration profile is always continuous along the thickness direction, hence resulting in continuous density and impedance profile.

With the feature of the minimized impedance mismatch, the microcellular polymers fabricated from solid-state foaming process can reduce the wireless signal transmission loss when materials with different dielectric constants are required in design. First of all, signals in wireless communication applications are in microwave and radio wave range, in which the frequency is lower than 300 GHz and the wavelength is longer than 1 mm. While in microcellular foam, the pore size is in the magnitude of 10 μm, which is much shorter than the signal wave length. Hence, the wave signal can propagate inside the microcellular foam with negligible signal loss by diffraction. Therefore, it is feasible to use microcellular foam as the dielectric material with controllable dielectric constant in the wireless communication applications. The method has potential to achieve unique functions when different dielectric constants are required but other intrinsic properties of the material (such as $T_g$, $T_m$ and chemical resistance) need to be constant. The solid-state microcellular foaming process can control the dielectric constant by modifying porosity, but the intrinsic properties will remain the same.

The multi-layered structures with gradual transition feature can be created in the forms shown in FIG. 15: a) multi-layer in the thickness direction of a sheet; b) multi-layer in the radial direction of a sheet; c) multi-layer in the radial direction of a sphere; and d) multi-layer in the radial direction of a cylinder. The potential forms also include multi-layered components with other shapes such as cubic and ellipsoid. Again, due to the gradual transitions between the layers with different dielectric constant, those structures can minimize the impedance mismatch in the wireless communication applications.

The innovative concepts relating to multi-layered microcellular structures can be applied to various applications such as, for example, antenna design (such as radome), RFID design, microelectronics, cable winding design, and substrates for electronics (such as PCBs).

Antenna applications: an antenna is a transducer designed to transmit or receive electromagnetic waves. When encountering an interface, the waves are partially reflected and partially transmitted through. Minimizing impedance differences at each interface (impedance matching) will increase power transfer through each part of the antenna system. The multi-layered microcellular foams have gradual transitions between the neighboring layers. Thus, the dielectric constants of the foams changes gradually though the normal direction of the layers, resulting in less signal loss during transmission. With the unique gradual transition feature, the multi-layered microcellular structures can be used in antenna design as antenna insulation, antenna shielding (radome), etc.

RFID applications: Radio-frequency identification (RFID) is an automatic identification method that relies on storing and remotely retrieving data using devices called RFID tags or transponders. By using a substrate with lower dielectric constant for the RFID tag, one can decrease resistive capacitive (RC) delay, and improve the signal delay issue. The low dielectric constant can be relatively easily achieved by foaming the substrate material.

Microelectronics: In microelectronics, multilayer metallization and the interlayer dielectric (ILD) have become the limiting factors in process integration and device performance. As the distance between the interconnect lines decreases, the lines start to influence each other. With $SiO_2$ based ILD could cause inductive cross-talk and high RC delay due to high k (dielectric constant). The low-k ILD has been attracted tremendous attentions of the researchers. The porous thermoplastic material from solid-state foaming process has potential to further lower the dielectric constant.

Substrate for electronics: As noted above, the porous material from solid-sate foaming process has potential to lower the dielectric constant. In electronic field, with the foam as the substrate material, say printed circuit board (PCB), the lowered dielectric constant can allow increasing the density of electronic circuitry due to the lower heat generation potential of lower dielectric substrates. Such substrates can be used to either print electronic circuits directly or laminate metal layers onto the microcellular plastic substrate.

For purposes of illustration and not limitation, the following examples more specifically discloses exemplary manufacturing steps and actual experimental results associated with the manufacture of multi-layered foamed polymeric objects and articles of manufacture in accordance with the present invention.

EXAMPLE 1

A 3.8 cm diameter circular section of polymer was punched from 0.107 cm thick sheet of recycled PET (RPET) acquired from LaVergne (The LaVergne Group, Canada). The polymer was then wrapped in a paper towel and placed in a pressure vessel (~21° C.) at 5.0 MPa for 72 hours for the purpose of carbon dioxide absorption. After absorption, the polymer was transferred to a freezer (~0° C.) for 24 hours to allow carbon dioxide desorption. The polymer was then removed and placed at room temperature (~20° C.) for one hour for further desorption. The polymer was then heated (~100° C.) in a silicon bath for 30 seconds to initiate foaming. FIG. 1 is a scanning electron micrograph showing a partial cross-sectional view from the center of the thermoformed circular polymer section manufactured using the above procedure.

EXAMPLE 2

Figure 7:
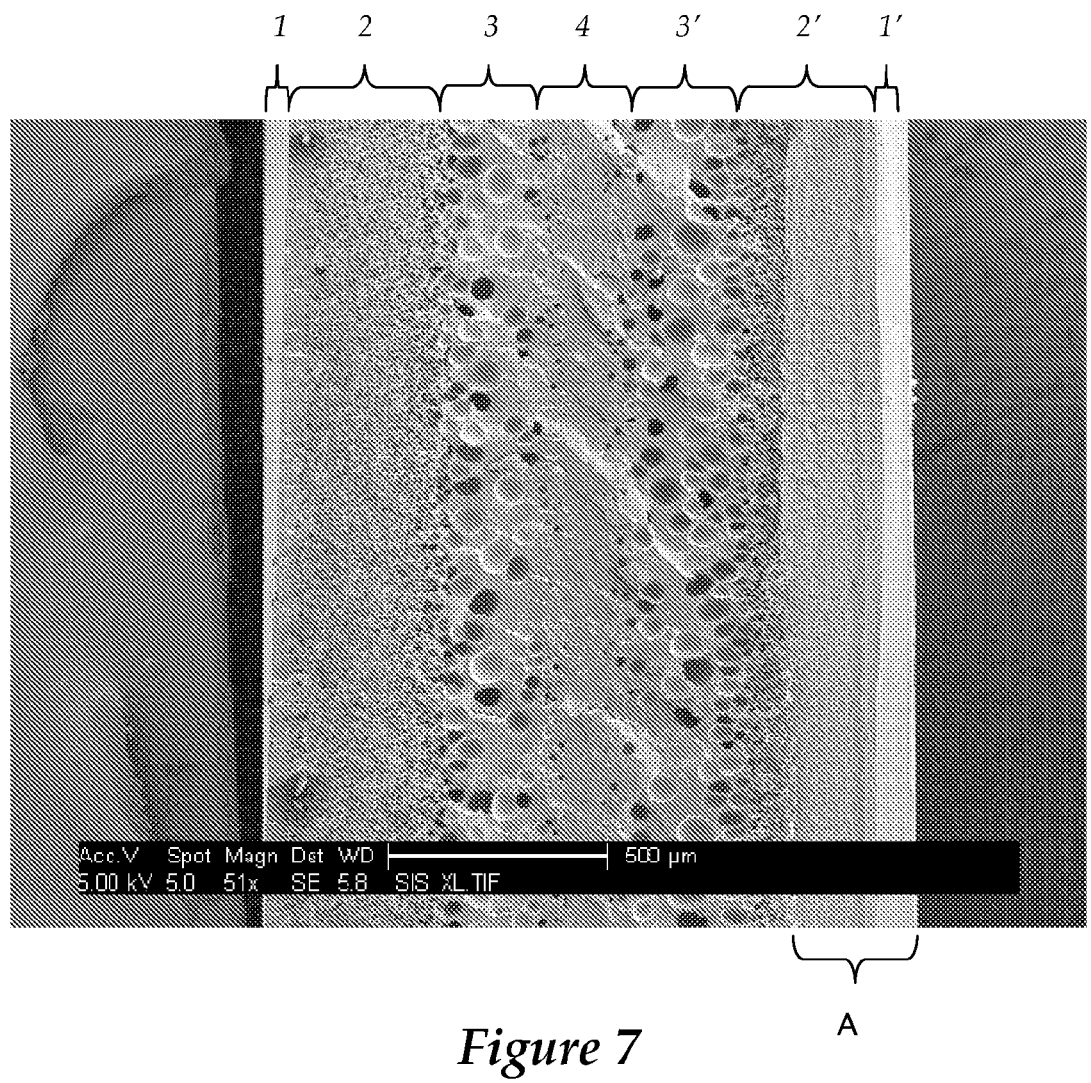
FIG. 7 is scanning electron micrograph showing a partial cross-sectional view of a thermoformed rectangular coupon of RPET (10 cm×15 cm×0.107 cm) exhibiting a multi-layer foamed structure in accordance with an embodiment of the present invention.

A 3.8 cm diameter circular section of polymer was punched from 0.107 cm thick sheet of recycled PET (RPET) acquired from LaVergne (The LaVergne Group, Canada). The polymer was then wrapped in a paper towel and placed in a pressure vessel (~21° C.) at 5.0 MPa for 36 hours for the purpose of carbon dioxide absorption. After absorption, the polymer was transferred to a freezer (~0° C.) for 24 hours to allow carbon dioxide desorption. The polymer was then removed and placed at room temperature (~20° C.) for one hour for further desorption. The polymer was then heated (~100° C.) in a silicon bath for 30 seconds to initiate foaming. FIG. 7 is a scanning electron micrograph showing a partial cross-sectional view from the center of the thermoformed circular polymer section manufactured using the above procedure.

EXAMPLE 3

Figure 8:
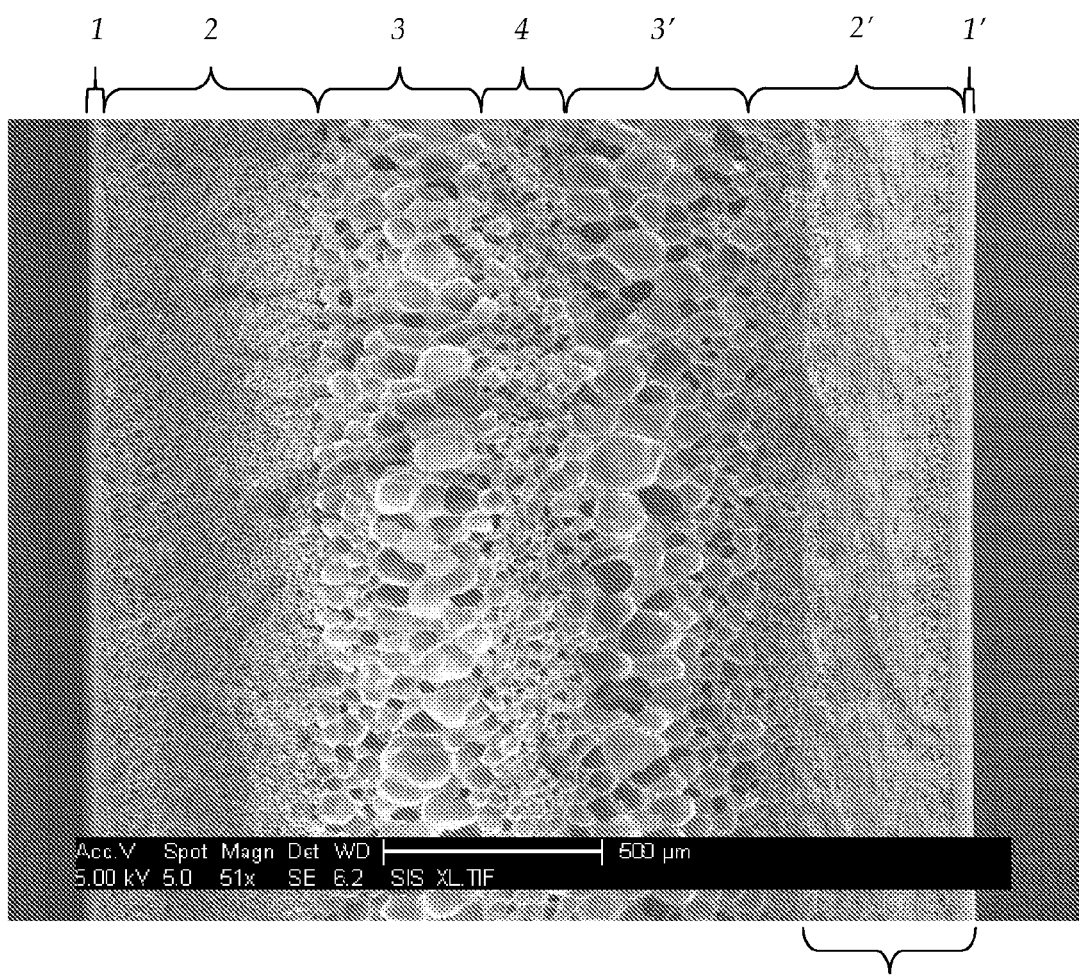
FIG. 8 is a scanning electron micrograph showing a partial cross-sectional view of a thermoformed rectangular coupon of RPET (10 cm×15 cm×0.107 cm) exhibiting a multi-layer foamed structure in accordance with an embodiment of the present invention.

A 10 cm×15 cm rectangular section of polymer was cut from 0.107 cm thick sheet of recycled PET (RPET) acquired from LaVergne (The LaVergne Group, Canada). The polymer was then wrapped in a paper towel and placed in a pressure vessel (~21° C.) at 5.0 MPa for 49 hours for the purpose of carbon dioxide absorption. After absorption, the polymer was transferred to a freezer (~0° C.) for 24 hours to allow carbon dioxide desorption. The polymer was then removed and placed at room temperature (~20° C.) for one hour for further desorption. The polymer was then loaded into a thermoformer clamping frame, wherein the polymer was heated (~110° C.) using infrared heat for 8 seconds and simultaneously stretched to initiate foaming. FIG. 8 is a scanning electron micrograph showing a partial cross-sectional view from the center portion of a thermoformed rectangular polymer section manufactured using the above procedure.

EXAMPLE 4

Figure 9:
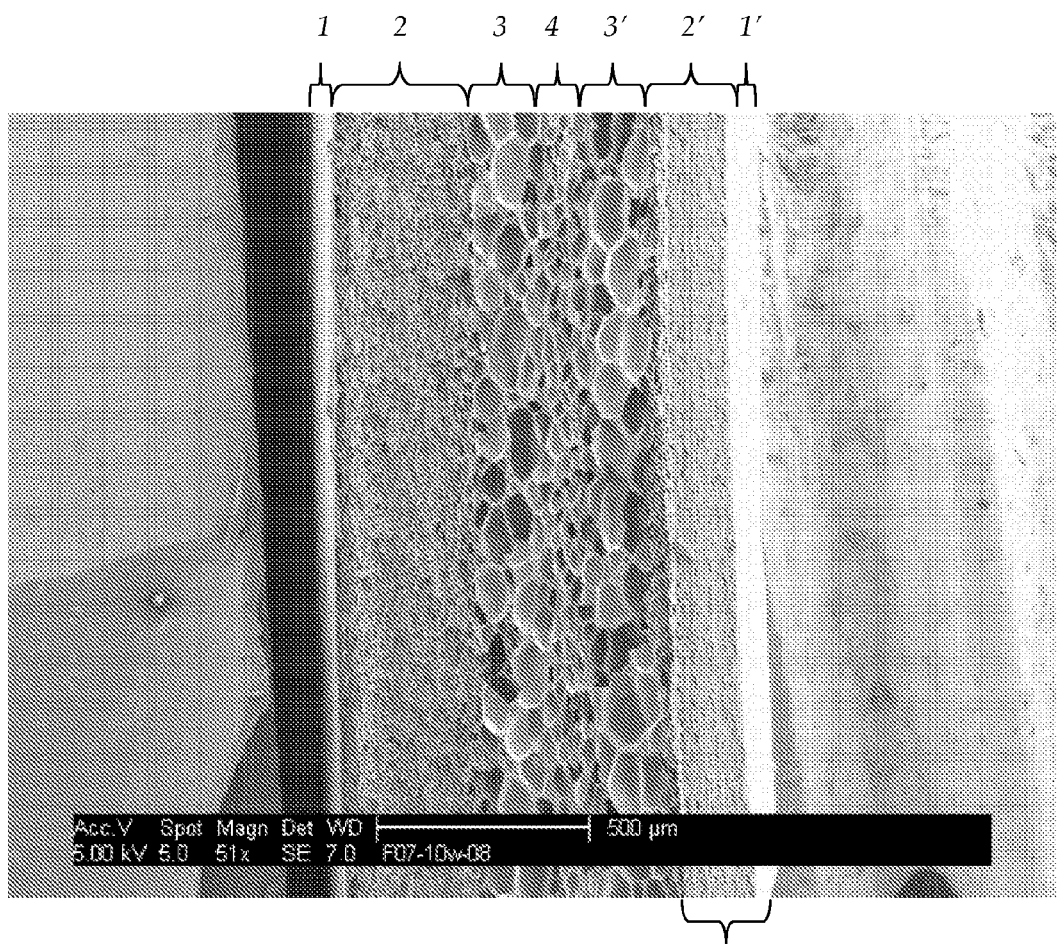
FIG. 9 is scanning electron micrograph showing a partial cross-sectional view of a square of RPET (23 cm×23 cm×0.107 cm) (taken from the middle wall section of a thermoformed cup) having an average relative density of about 14% exhibiting a multi-layer foamed structure in accordance with an embodiment of the present invention.

A 10 cm×15 cm rectangular section of polymer was cut from 0.107 cm thick sheet of recycled PET (RPET) acquired from LaVergne (The LaVergne Group, Canada). The polymer was then wrapped in a paper towel and placed in a pressure vessel (~21° C.) at 5.0 MPa for 49 hours for the purpose of carbon dioxide absorption. After absorption, the polymer was transferred to a freezer (~0° C.) for 24 hours to allow carbon dioxide desorption. The polymer was then removed and placed at room temperature (~20° C.) for one hour for further desorption. The polymer was then loaded into a thermoformer clamping frame, wherein the polymer was heated (~110° C.) using infrared heat for 16 seconds and simultaneously stretched to initiate foaming. FIG. 9 is a scanning electron micrograph showing a partial cross-sectional view from the center portion of a thermoformed rectangular polymer section manufactured using the above procedure.

EXAMPLE 5

Figure 10:
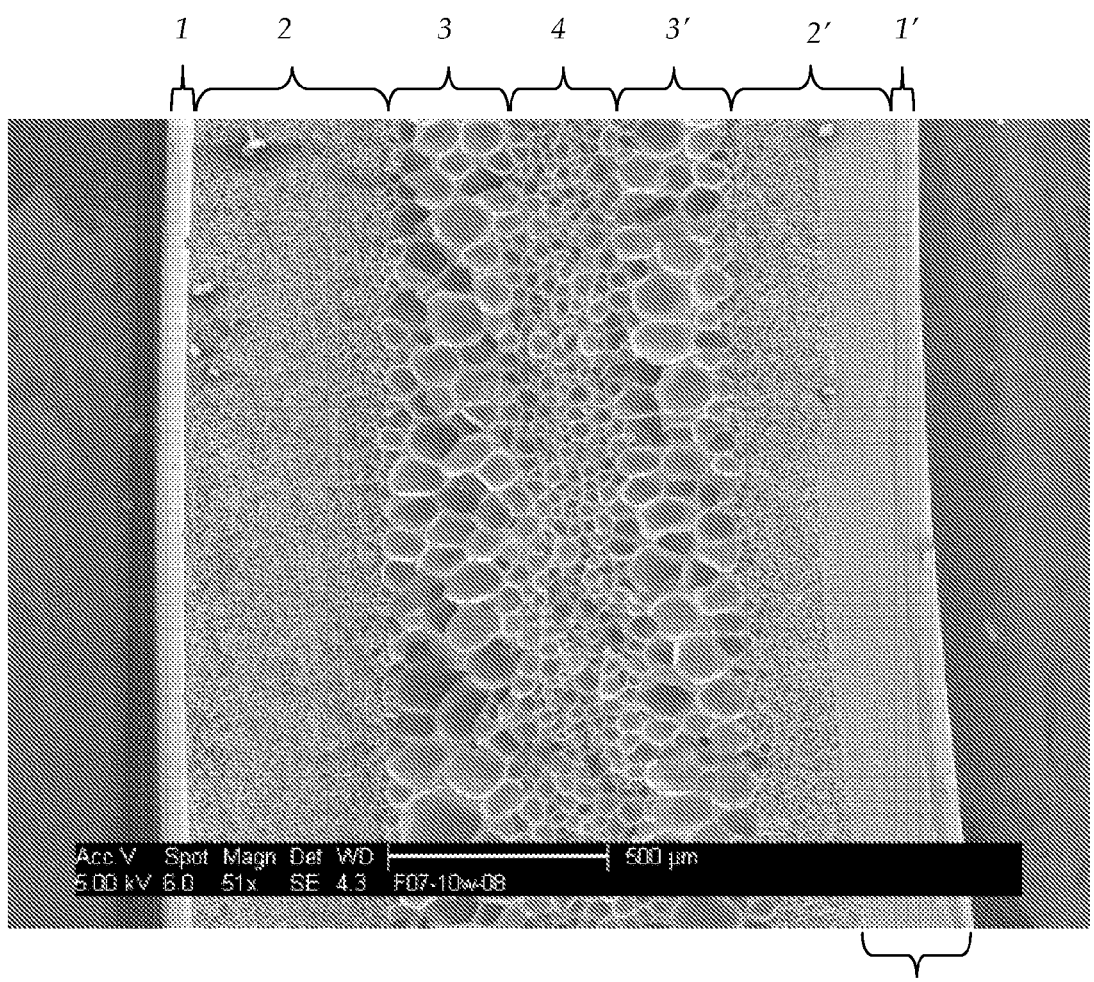
FIG. 10 is scanning electron micrograph showing a partial cross-sectional view of a square of RPET (23 cm×23 cm×0.107 cm) (taken from the upper portion of a thermoformed cup) exhibiting a multi-layer foamed structure in accordance with an embodiment of the present invention.
Figure 11:
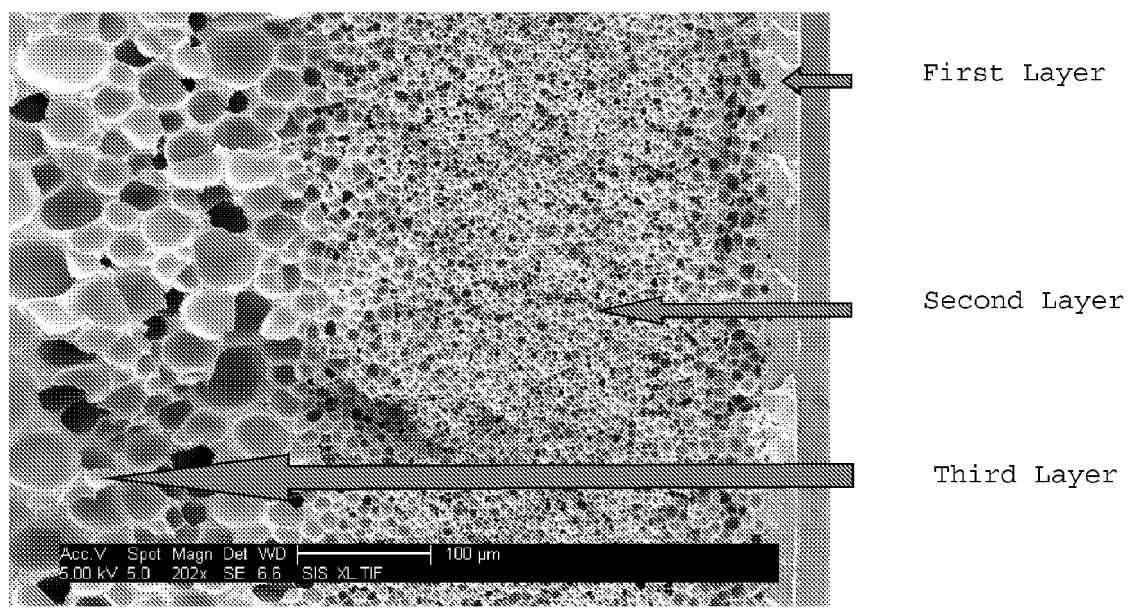
FIG. 11 is scanning electron micrograph showing a partial cross-sectional view of a thermoformed sample of RPET exhibiting a multi-layer foamed structure in accordance with an embodiment of the present invention (namely, a microcellularly foamed sample having an outer skin layer with a relatively high-level dielectric constant, a transition layer with a mid-level dielectric constant, and a foamed layer with a relatively low-level dielectric constant).

A 23 cm×23 cm square section of polymer was cut from 0.107 cm thick sheet of recycled PET (RPET) acquired from LaVergne (The LaVergne Group, Canada) (P3000 RPET 0.042" roll stock). The polymer was then wrapped in a paper towel and placed in a pressure vessel (~21° C.) at 5.0 MPa for 49 hours for the purpose of carbon dioxide absorption. After absorption, the polymer was transferred to a freezer (~0° C.) for 24 hours to allow carbon dioxide desorption. The polymer was then removed and placed at room temperature (~20° C.) for one hour for further desorption. The polymer was then loaded into a thermoformer clamping frame, wherein the polymer was heated (~110° C.) using infrared heat for 12 seconds and simultaneously stretched to initiate foaming. The polymer was then thermoformed into a cup shape using a convex aluminum plug (~32° C.) to assist the drawing of the polymer into the female mold (~155° C.). Air pressure was used to force the polymer into its final cup shape. FIG. 2 is a scanning electron micrograph showing a partial cross-sectional view from the base portion of a thermoformed cup manufactured using the above procedure. FIG. 10 is a scanning electron micrograph showing a partial cross-sectional view from the middle portion of a thermoformed cup manufactured using the above procedure. FIG. 11 is a scanning electron micrograph showing a partial cross-sectional view from the upper portion of a thermoformed cup manufactured using the above procedure.

EXAMPLE 6

To validate the concepts associated with the graded (i.e., a gradient of) physical properties aspect of the invention, the inventors analyzed sample foams having microstructures similar to those shown in FIGS. 1 and 2. The flexural modulus of each sample was measured using Dynamic Mechanical Analysis (DMA) per ASTM standard D790. The skin thicknesses were measured by conducting scanning electron microscopy and taking the average of 8 to 12 measurements at various locations. The measured flexural modulus was a combined or "apparent" modulus of the cellular core combined with the solid skin. Since the DMA results gave the combined modulus, a Combined Foam Relative Stiffness was calculated by using the combined modulus multiplied by the combined moment of inertia of the entire section (as if the skin and core were homogenous). The Calculated Relative stiffness assumed that the foamed core was homogeneous (even though it was not), and the modulus was calculated per Ashby and Gibson's formula for closed cell foams with $\emptyset=0.6$. The stiffness of the skin layers were calculated as the measured modulus of the base polymer multiplied by the geometric moment of inertia of the skin layer. The hypothetical core's stiffness was added to the skin's calculated stiffness to obtain a combined stiffness. The actual measured foam relative stiffness was larger than calculated with the above assumptions in every case. The following table summarizes the test results.

| Starting Solid Thickness inches | Foam Relative Thickness | Skin Thickness | Foam Avg. Rel Density | Actual Measured Foam Sheet Relative Stiffness | Calculated Relative Stiffness Per Ashby & Gibson |
| --- | --- | --- | --- | --- | --- |
| 0.042 - A | 186% | 0.0004 | 19% | 108.9% | 72.5% |
| 0.042 - B | 179% | 0.0006 | 22% | 105.0% | 84.4% |
| 0.042 - C | 188% | 0.0006 | 19% | 115.9% | 87.9% |
| 0.042 - C | 174% | 0.0004 | 23% | 95.5% | 74.2% |
| 0.025 | 208% | 0.0003 | 16% | 106.7% | 88.39% |

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A multi-layer foamed polymeric article of manufacture having a plurality of different thermal and electrical properties segmented across one or more dimensions, comprising:
   a non-laminated multi-layer thermoplastic material object having at least one discrete outer unfoamed skin layer positioned adjacent to a plurality of discrete inner foamed layers,
      wherein the thermoplastic material object has a crystallinity gradient such that:
         the crystallinity of the plurality of discrete inner foamed layers is less than the crystallinity of the at least one discrete outer unfoamed skin layer, and
         the crystallinity of the inner foamed layer closest to the discrete outer unfoamed skin layer is more than the crystallinity of an inner-foamed layer disposed further away from the discrete outer unfoamed skin layer,
      wherein the at least one discrete outer unfoamed skin layer and the plurality of discrete inner foamed layers are integral with one another, wherein the plurality of discrete inner foamed layers each have a thickness that is greater than the thickness of the discrete outer unfoamed skin layer, and
      wherein the at least one discrete outer unfoamed skin layer has an outer skin layer physical property and each of the plurality of discrete inner foamed layers has a respective inner foamed layer physical property, wherein the outer skin layer physical property and the inner foamed layer physical property are different from each other.

2. The multi-layer foamed polymeric article of manufacture according to claim 1 wherein the thermoplastic material object is a semi-crystalline polymer, an amorphous polymer, or a combination thereof.

3. The multi-layer foamed polymeric article of manufacture according to claim 2 wherein the thermoplastic material is a polymer selected from the group consisting of PET (polyethylene terephthalate), PEEK (polyetheretherketone), PEN (polyethylene napthalate), PBT (polybutylene terphthalate), PLA (polyactide), PEI (polyetherimide), PEKK (polyetherketoneketone), polycarbonate, and blends thereof.

4. The multi-layer foamed polymeric article of manufacture according to claim 3 wherein each of the plurality of discrete inner foamed layers is microcellular.

5. The multi-layer foamed polymeric article of manufacture according to claim 4 wherein the multi-layer thermoplastic material object is in the form of a multi-layer polymeric sheet, a multi-layer polymeric sphere, or a multi-layer polymeric cylinder.

6. The multi-layer foamed polymeric article of manufacture according to claim 4 wherein the multi-layer thermoplastic material object is a multi-layer polymeric sheet, wherein the plurality of discrete physical properties vary in a step-wise manner across the thickness of the sheet.

7. The multi-layer foamed polymeric article of manufacture according to claim 4 wherein the multi-layer thermoplastic material object is a multi-layer polymeric sheet, wherein the plurality of discrete physical properties vary in a step-wise manner across the surface of the sheet.

8. The multi-layer foamed polymeric article of manufacture according to claim 4 wherein the outer skin layer physical property has a first dielectric constant and the inner foamed layer physical property has a second dielectric constant, wherein the first dielectric constant is greater than the second dielectric constant.

9. The multi-layer foamed polymeric article of manufacture according to claim 4 wherein the outer skin layer physical property has a first heat capacity and the inner foamed layer physical property has a second heat capacity, wherein the first heat capacity is greater than the second heat capacity.

10. The multi-layer foamed polymeric article of manufacture according to claim 4 wherein the at least one discrete outer unfoamed skin layer has a smooth outer surface.

11. The multi-layer foamed polymeric article of manufacture according to claim 4 wherein the plurality of discrete inner foamed layers include two substantially identical second inner foamed layers, each positioned immediately adjacent to a respective one of two outer skin layers.

12. The multi-layer foamed polymeric article of manufacture according to claim 11 wherein the second inner foamed layers each include a first plurality of closed cells, wherein the first plurality of closed cells have an average cell diameter ranging from about 5 to 10 microns.

13. The multi-layer foamed polymeric article of manufacture according to claim 11 wherein the plurality of discrete inner foamed layers include a third inner foamed layer positioned immediately adjacent to and interposed between the second inner foamed layers.

14. The multi-layer foamed polymeric article of manufacture according to claim 11 wherein the plurality of discrete inner foamed layers include two substantially identical third inner foamed layers, each positioned immediately adjacent to a respective one of the second inner foamed layers.

15. The multi-layer foamed polymeric article of manufacture according to claim 14 wherein the third inner foamed layers each include a second plurality of closed cells, wherein the second plurality of closed cells have an average cell diameter ranging from about 30 to about 50 microns.

16. The multi-layer foamed polymeric article of manufacture according to claim 15 wherein the plurality of discrete inner foamed layers include a central fourth inner foamed layer positioned immediately adjacent to and interposed between the third inner foamed layers.

17. The multi-layer foamed polymeric article of manufacture according to claim 16 wherein the fourth inner foamed layer includes a third plurality of closed cells, wherein the third plurality of closed cells have an average cell diameter ranging from about 20 to about 40 microns.

18. The multi-layer foamed polymeric article of manufacture according to claim 4 wherein the density and stiffness of the multi-layer thermoplastic material sheet are graded across the sheet such that the outermost layers of the plurality of discrete inner foamed layers have the greatest density and stiffness of the plurality of discrete inner foamed layers.

19. A multi-layer polymeric article of manufacture, comprising:
a non-laminated multi-layer thermoplastic material object having at least one discrete outer unfoamed skin layer positioned adjacent to a plurality of discrete inner foamed layers,
wherein the thermoplastic material object has a crystallinity gradient such that:
the crystallinity of the plurality of discrete inner foamed layers is less than the crystallinity of the at least one discrete outer unfoamed skin layer, and
the crystallinity of the inner foamed layer closest to the discrete outer unfoamed skin layer is more than the crystallinity of an inner foamed layer disposed further away from the discrete outer unfoamed skin layer,
wherein the at least one outer unfoamed skin layer and the plurality of inner foamed layers are integral with one another,
wherein each of the plurality of inner foamed layers has a thickness greater than the thickness of the outer unfoamed skin layer,
wherein each of the plurality of inner foamed layers is populated with microcellular bubbles of about the same shape, with each layer having an average bubble size that is different than any adjacent layer, and
wherein the at least one discrete outer unfoamed skin layer has a dielectric constant and each of the plurality of discrete inner foamed layers has a respective dielectric constant, wherein the dielectric constant of each of the outer and inner layers is different than the dielectric constant of each of the other outer and inner layers.

20. The multi-layer polymeric article of manufacture of claim 19 wherein the plurality of inner foamed layers include a first layer immediately adjacent to the at least one outer skin layer and a second layer immediately adjacent to the first layer.

21. The multi-layer polymeric article of manufacture of claim 20 wherein the plurality of inner foamed layers include a third layer immediately adjacent to the second layer.

22. The multi-layer polymeric article of manufacture of claim 21 wherein the first layer is populated with microcellular bubbles of about 1 to about 20 microns in average size.

23. The multi-layer polymeric article of manufacture of claim 22 wherein the second layer is populated with microcellular bubbles of about 15 microns to about 200 microns in average size.

24. The multi-layer polymeric article of manufacture of claim 23 wherein the second layer is populated with microcellular bubbles of about 50 microns to about 200 microns in average size.

25. The multi-layer polymeric article of manufacture of claim 24 wherein the thermoplastic material is a semi-crystalline polymer or an amorphous polymer.

26. A multi-layer polymeric article of manufacture, comprising:
a non-laminated multi-layer thermoplastic material object having:
at least one first outer unfoamed skin layer having a first dielectric constant,
at least one second discrete inner foamed layer having a second dielectric constant,
at least one third discrete inner foamed layer having a third dielectric constant, wherein the at least one second discrete inner foamed layer is closer to the at least one first outer unfoamed skin layer than the at least one third discrete inner foamed layer,
wherein the thermoplastic material object has a crystallinity gradient such that:
the crystallinity of the at least one second discrete inner-foamed layer is less than the crystallinity of the at least one first outer unfoamed skin layer, and
the crystallinity of the at least one third discrete inner-foamed layer is less than the crystallinity of the at least one second discrete inner-foamed layer,
wherein the at least one first outer unfoamed skin layer and the second and third inner foamed layers are integral with one another,
wherein the second and third inner foamed layers each has a thickness greater than the thickness of the first outer unfoamed skin layer,
wherein the first dielectric constant is greater than the second dielectric constant, and
wherein the second dielectric constant is greater than the third dielectric constant.

27. The multi-layer polymeric article of manufacture of claim 26 wherein the thermoplastic material is a semi-crystalline polymer or an amorphous polymer.

* * * * *